United States Patent
Bruce et al.

(10) Patent No.: US 11,600,840 B2
(45) Date of Patent: Mar. 7, 2023

(54) SYSTEMS AND METHODS FOR FUEL CELLS ENERGY STORAGE AND RECOVERY

(71) Applicant: ZINC8 ENERGY SOLUTIONS INC., Vancouver (CA)

(72) Inventors: David Robert Bruce, Vancouver (CA); Simon Fan, Richmond (CA); John McLeod, Surrey (CA); Tristan Sloan, Vancouver (CA)

(73) Assignee: ZINC8 ENERGY SOLUTIONS INC., Vancouver (CA)

( * ) Notice: Subject to any disclaimer, the term of this patent is extended or adjusted under 35 U.S.C. 154(b) by 75 days.

(21) Appl. No.: 17/352,558

(22) Filed: Jun. 21, 2021

(65) Prior Publication Data
US 2021/0376368 A1 Dec. 2, 2021

Related U.S. Application Data

(62) Division of application No. 16/320,839, filed as application No. PCT/CA2017/050895 on Jul. 25, 2017, now Pat. No. 11,133,520.
(Continued)

(51) Int. Cl.
*H01M 8/22* (2006.01)
*H01M 8/0656* (2016.01)
(Continued)

(52) U.S. Cl.
CPC ......... *H01M 8/225* (2013.01); *H01M 8/0656* (2013.01); *H01M 8/184* (2013.01); *H01M 8/20* (2013.01); *Y02E 60/50* (2013.01)

(58) Field of Classification Search
CPC .... H01M 8/225; H01M 8/0656; H01M 8/184; H01M 8/20
See application file for complete search history.

(56) References Cited

U.S. PATENT DOCUMENTS

| 6,764,785 B2 | 7/2004 | Colborn et al. |
| 2003/0134172 A1 | 7/2003 | Grande et al. |

(Continued)

FOREIGN PATENT DOCUMENTS

| DE | 102007011311 A1 | 6/2008 |
| FI | 125195 B | 6/2015 |

(Continued)

OTHER PUBLICATIONS

Fu et al., "Electrically Rechargeable Zinc-Air Batteries: Progress, Challenges, and Perspectives", Advanced Materials, 2017 (34 pages).
(Continued)

*Primary Examiner* — Sarah A. Slifka
(74) *Attorney, Agent, or Firm* — Taylor IP, P.C.

(57) ABSTRACT

Systems and methods for energy storage system are provided. The system includes a particle regeneration subsystem for applying electrical energy to regenerate metallic particulate fuel; a fuel storage subsystem for storing metallic particulate fuel, the fuel storage subsystem in fluid communication with the particle regeneration subsystem; and a power generation subsystem for producing electrical energy from the metallic particulate fuel, the power generation subsystem in fluid communication with the fuel storage subsystem; a bearer electrolyte for transporting the metallic particulate fuel through the particle regeneration subsystem, the fuel storage subsystem and the power generation subsystem; and a control unit configured to independently control flow of the bearer electrolyte between the particle regeneration subsystem and the fuel storage subsystem, and the fuel storage subsystem and the power generation subsystem.

17 Claims, 16 Drawing Sheets

Related U.S. Application Data

(60) Provisional application No. 62/367,768, filed on Jul. 28, 2016.

(51) Int. Cl.
*H01M 8/18* (2006.01)
*H01M 8/20* (2006.01)

(56) References Cited

U.S. PATENT DOCUMENTS

2004/0247961 A1  12/2004  Edlund
2014/0193724 A1  7/2014   Daniel et al.

FOREIGN PATENT DOCUMENTS

WO  2004025760 A1  3/2004
WO  2006001863 A2  1/2006

OTHER PUBLICATIONS

Wang et al., "Morphology control of zinc regeneration for zinc-air fuel cell and battery", Journal of Power Sources, 2014, vol. 271, p. 65-75 (11 pages).
International Search Report and Written Opinion dated Oct. 13, 2017 for International Application No. PCT/CA2017/050895 (19 pages).

SYSTEMS AND METHODS FOR FUEL CELLS ENERGY STORAGE AND RECOVERY

REFERENCE TO RELATED APPLICATIONS

This application is a divisional application of U.S. patent application Ser. No. 16/320,839, filed on Jan. 25, 2019, which is entitled "SYSTEMS AND METHODS FOR STORING ELECTRICAL ENERGY", which was a national phase entry of Patent Cooperation Treaty patent application No. PCT/CA2017/050895 filed 25 Jul. 2017, which claims priority to, and the benefit of, U.S. provisional patent application No. 62/367,768 filed 28 Jul. 2016. Each of the foregoing applications are incorporated by reference herein for all purposes.

TECHNICAL FIELD

This invention relates to systems and methods for storing electrical energy, in particular for regenerative fuel cells.

BACKGROUND

U.S. Pat. No. 6,764,785 describes a system and method for building a regenerative fuel cell system. The system and method described therein is useful for a variety of applications in which the efficiency of the energy storage process is not of prime importance. Systems and methods that enable energy to be stored and recovered in an efficient and cost-effective manner are desirable. Systems and methods that enable reactant products resulting from the energy storage process to be separated for efficient, convenient and reliable operation are also desirable.

SUMMARY

The inventions described herein have many aspects, some of which relate to systems and methods for storing electrical energy, in particular for regenerative fuel cells.

According to one aspect, an energy storage system is provided. The system comprises: a particle regeneration subsystem for applying electrical energy to regenerate metallic particulate fuel; a fuel storage subsystem for storing metallic particulate fuel, the fuel storage subsystem in fluid communication with the particle regeneration subsystem; and a power generation subsystem for producing electrical energy from the metallic particulate fuel, the power generation subsystem in fluid communication with the fuel storage subsystem; a bearer electrolyte for transporting the metallic particulate fuel through the particle regeneration subsystem, the fuel storage subsystem and the power generation subsystem; and a control unit configured to independently control flow of the bearer electrolyte between the particle regeneration subsystem and the fuel storage subsystem, and the fuel storage subsystem and the power generation subsystem.

The metallic particulate fuel may comprise zinc particles having a dendritic morphology and a size distribution in the range 10 to 1000 microns. The bearer electrolyte may comprise a solution of potassium hydroxide. The particle regeneration subsystem may comprise one or more regenerator stacks that, when electrical energy is applied, regenerate the metallic particulate fuel comprising zinc particles having a dendritic morphology and produce a gaseous effluent.

The system may comprise one or more intermediate tanks in fluid communication between the one or more regenerator stacks and the fuel storage subsystem. The one or more intermediate tanks may be configured to release the gaseous effluent to the atmosphere. The one or more intermediate tanks may be configured to separate the metallic particulate fuel from the bearer electrolyte. Gravity settling may separate the metallic particulate fuel from the bearer electrolyte.

The one or more intermediate tanks may be integrated with a respective one of the one or more regenerator stacks.

At least one of the one or more intermediate tanks may be configured as a header tank physically positioned above the one or more regenerator stacks.

The system may comprise a first conduit with a first valve between the header tank and a first regenerator stack, and a second conduit with a second valve between the header tank and a second regenerator stack, wherein the first and second valves are independently operable to allow independent control of flow of electrolyte from the header tank to the first and second regenerator stacks.

The header tank may comprise a check valve configured to enable closed channel flow between the header tank and the first and second regenerator stacks.

At least one of the one or more intermediate tanks may be configured as sump tank physically positioned below the one or more regenerator stacks.

The fuel storage subsystem may comprise one or more fuel tanks.

The power generation subsystem may comprise one or more power generation stacks.

The control unit may be configured to independently control flow of the bearer electrolyte between the one or more regenerator stacks and the one or more intermediate tanks, the one or more intermediate tanks and the fuel storage subsystem, and the fuel storage subsystem and the power generation subsystem.

The control unit may comprise configured to independently control flow of the bearer electrolyte between a first regenerator stack and a first intermediate tank, and between a second regenerator stack and a second intermediate tank.

The control unit may be configured to independently control flow of the bearer electrolyte between the header tank and the one or more regenerator stacks.

The control unit may be configured to independently control flow of the bearer electrolyte between the sump tank and the fuel storage subsystem, and the sump tank and the one or more intermediate tanks that are not a sump tank.

The control unit may be configured to independently control flow of the bearer electrolyte between the sump tank and the fuel storage subsystem, the sump tank and the one or more regenerator stacks, and the sump tank and the header tank.

The particle regeneration subsystem, the fuel storage subsystem and the power generation subsystem may be housed in corresponding compartmentalized bays.

The volume capacity of the bay housing the fuel storage subsystem may range from 100 L to 10,000 L. The energy capacity of the bay housing the fuel storage subsystem may range from 10 kWh to 1000 kWh.

A ratio of power capacity of the bay housing the particle regeneration subsystem and power capacity of the bay housing the power generation subsystem may range from 4:1 to 1:4.

The power capacity of the bay housing the particle regeneration subsystem may exceed the power capacity of the bay housing the power generation subsystem.

The number of bays housing the particle regeneration subsystem connected to a single bay housing the fuel storage subsystem may range from one to four.

The number of bays housing the power generation subsystem connected to a single bay housing the fuel storage subsystem may range from one to four.

In another aspect, a method for storing electrical energy is provided. The method comprises: (a) receiving electrical energy from an external source; (b) electro-depositing a metallic particulate material within a regenerator stack by applying the electrical energy; (c) delivering the metallic particulate material in a bearer electrolyte from the regenerator stack to a fuel storage tank at a first flow rate; (d) storing the metallic particulate material in the bearer electrolyte in the fuel storage tank; (e) delivering the stored metallic particulate material in the bearer electrolyte from the fuel storage tank to a power generation stack at a second flow rate; (f) generating electricity by discharging the metallic particulate material within the power generation stack; (g) returning metal ion rich electrolyte from the power generation stack to the fuel storage tank at a third flow rate; and (h) returning metal ion rich electrolyte from the fuel storage tank to the regenerator stack at a fourth flow rate; wherein the first flow rate and the fourth flow rate are independently selectable to optimize step (b) and the second flow rate and the third flow rate are independently selectable to optimize step (f) and to allow independent scaling of the regenerator stack, the fuel storage tank and the power generation stack.

The metallic particulate material may comprise zinc particles having a dendritic morphology and a size distribution in the range 10 to 1000 microns. The electrolyte may comprise a solution of potassium hydroxide.

An intermediate tank may be provided between the regenerator stack and the fuel storage tank.

The method may comprise exhausting oxygen from the electrolyte from the regenerator stack at the intermediate tank to prevent back pressure of the oxygen from building up in the regenerator stack.

A plurality of regenerator stacks may be provided, wherein each regenerator stack is physically positionable at a different vertical height with respect to the fuel storage tank.

The method may comprise gravity settling the metallic particulate material from the regenerator stack at the intermediate tank to provide a concentrated flow of the metallic particulate material to the fuel storage tank.

Step (c) may comprise delivering the metallic particulate material in the electrolyte from the regenerator stack to the intermediate tank at a fifth flow rate, and delivering the metallic particulate material in the electrolyte from the intermediate tank to the fuel storage tank at a sixth flow rate, wherein the fifth flow rate and the sixth flow rate are independently selectable to optimize step (b) and/or step (c) and to allow independent scaling of the regenerator stack, the intermediate tank and the fuel storage tank.

Step (c) may comprise delivering the metallic particulate material in the electrolyte from the intermediate tank to a sump tank at a seventh flow rate, and from the sump tank to the fuel storage tank at an eighth flow rate, wherein the seventh flow rate and the eighth flow rate are independently selectable to optimize step (b) and/or step (c) and to allow independent scaling of the regenerator stack, the intermediate tank, the sump tank and the fuel storage tank.

Step (c) may comprise delivering the metallic particulate material in the electrolyte from a second regenerator stack to a second intermediate tank at an ninth flow rate, and delivering the metallic particulate material in the electrolyte from the second intermediate tank to the fuel storage tank at a tenth flow rate, wherein the ninth flow rate and the tenth flow rate are independently selectable to optimize step (b) and/or step (c) and to allow independent scaling of the regenerator stack, the intermediate tank and the fuel storage tank.

Step (c) may comprise delivering the metallic particulate material in the electrolyte from a second intermediate tank to a sump tank at an eleventh flow rate, and from the sump tank to the fuel storage tank at the eighth flow rate, wherein the eighth flow rate and the eleventh flow rate are independently selectable to optimize step (b) and/or step (c) and to allow independent scaling of the regenerator stack, the intermediate tank, the sump tank and the fuel storage tank.

The method may comprise exhausting oxygen from the electrolyte from the regenerator stack at the sump tank.

The method may comprise physically positioning the sump tank at least as low as a lowest physically positioned regenerator stack.

Step (c) may comprise returning metal ion rich electrolyte from the fuel storage tank to the intermediate tank at a twelfth flow rate, and returning metal ion rich electrolyte from the intermediate tank to the regenerator stack at a thirteenth flow rate, wherein the twelfth flow rate and the thirteenth flow rate are independently selectable to optimize step (h) and to allow independent scaling of the regenerator stack, the intermediate tank and the fuel storage tank.

The intermediate tank may comprise a header tank and a sump tank, wherein step (h) further comprises returning metal ion rich electrolyte from the sump tank to header tank at a fourteenth flow rate and from the header tank to the regenerator stack at a fifteenth flow rate, wherein the fourteenth flow rate and the fifteenth flow rate are independently selectable to optimize step (h) and to allow independent scaling of the regenerator stack, the sump tank, the header tank and the fuel storage tank, further comprising physically positioning the header tank higher than the highest physically positioned regenerator stack and physically positioning the sump tank lower than the lowest physically positioned regenerator stack.

Step (h) may comprise returning metal ion rich electrolyte from the fuel storage tank to a second intermediate tank at a sixteenth flow rate, and returning metal ion rich electrolyte from the second intermediate tank to a second regenerator stack at a seventeenth flow rate, wherein the sixteenth flow rate and the seventeenth flow rate are independently selectable to optimize step (h) and to allow independent scaling of the regenerator stack, the second intermediate tank and the fuel storage tank.

The intermediate tank may comprise a header tank and a sump tank, wherein step (h) comprises returning metal ion rich electrolyte from the sump tank to header tank at a fourteenth flow rate and returning metal ion rich electrolyte from the header tank to a first regenerator stack at an eighteenth flow rate and from the header tank to a second regenerator stack at a nineteenth flow rate, wherein the eighteenth flow rate and the nineteenth flow rate are independently selectable to optimize step (b) and/or step (f) and to allow independent scaling of the regenerator stacks, the sump tank, the header tank and the fuel storage tank, further comprising physically positioning the header tank higher than the highest physically positioned regenerator stack and physically positioning the sump tank lower than the lowest physically positioned regenerator stack.

The method may comprise a priming step of setting the eighteenth flow rate and the nineteenth flow rate at zero and allowing the sump tank to fill the header tank with metal ion rich electrolyte to displace air in the header tank by opening a check valve in the header tank, and then subsequently closing the check valve and allowing the eighteenth flow rate and/or the nineteenth flow rate to resume through closed channel flow, wherein the closed channel flow also contributes to the fourteenth flow rate.

The foregoing discussion merely summarizes certain aspects of the inventions and is not intended, nor should it be construed, as limiting the inventions in any way.

BRIEF DESCRIPTION OF THE DRAWINGS

The accompanying drawings illustrate non-limiting example embodiments of the invention.

DESCRIPTION

Figure 1:
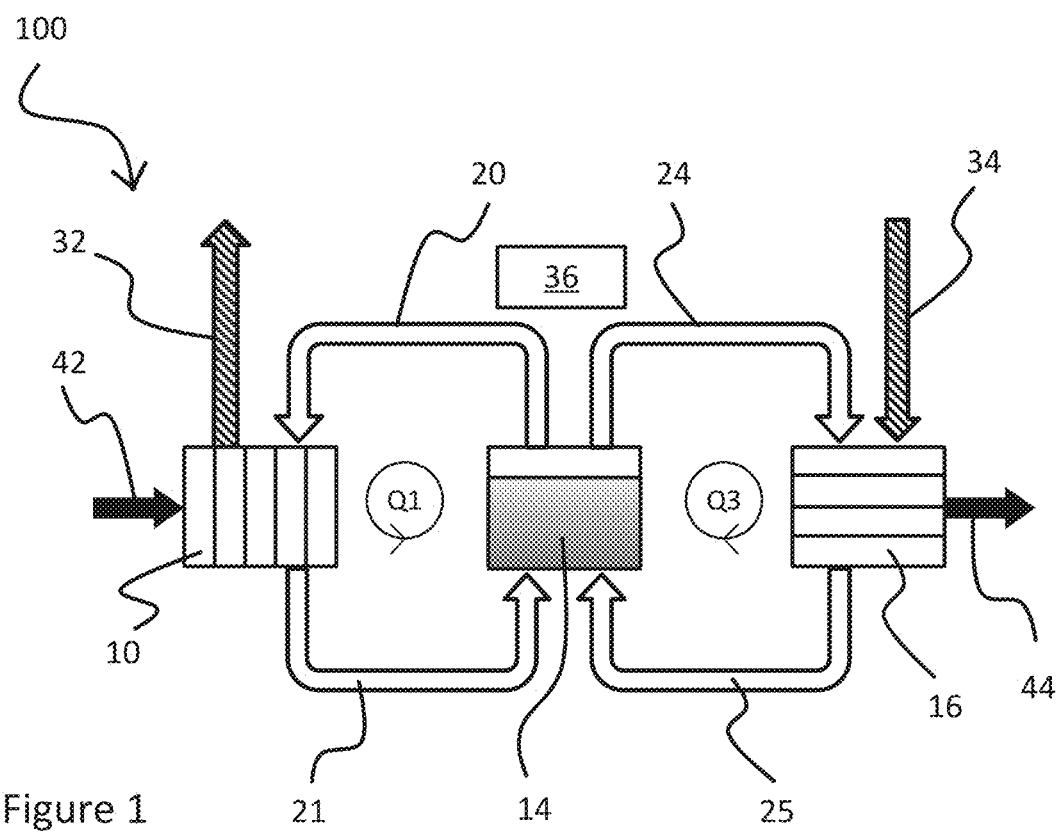
FIG. 1 is a block diagram of a regenerative fuel cell system according to an embodiment of the invention.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

The invention relates to regenerative fuel cell systems operable at high energy efficiency and reliability in a cost-effective manner. The system can be arranged physically to minimize the space occupied and to permit different configurations to be constructed to accommodate a broad spectrum of application requirements.

In one aspect, the regenerative fuel cell system comprises a particle regeneration subsystem for converting electrical energy to chemical energy as metallic particulate fuel, a fuel storage subsystem for storing said metallic particulate fuel and a power generation subsystem for generating electrical energy from said metallic particulate fuel. The separation of the fuel regeneration, fuel storage, and energy generation functions into discrete and independently operable subsystems provides for significant advantages over known rechargeable systems wherein two or more of these functions are combined or otherwise directly linked. Said separation not only enables the operation of each subsystem to be optimized for best performance, but also enables the configuration and materials used in each subsystem to be chosen for best efficiency, reliability and cost. For example, the separation reduces the requirement for bi-functionality in both catalyst selection and electrochemical electrode surface design—both of which are requirements for best performance of each function. These advantages are paralleled in terms of longevity as the stability of components can be selected based on single functionality without bi-functional limitation.

The particle regeneration subsystem provides additional benefits in operation and construction. In a metal-air flow battery employing a bearer electrolyte, recharging of the system requires a metal to be deposited on a negative electrode (cathode) while oxygen is evolved at a positive electrode (anode). It is advantageous that the evolved oxygen is able to escape freely from the electrolytic cell comprising the anode, cathode and bearer electrolyte to enable the reaction to proceed with best efficiency. It is further advantageous that the oxygen is able to escape the electrolytic cell at atmospheric pressure to avoid the need for pumps, valves, compressors and storage tanks that might otherwise be required.

Efficient electrical to chemical energy conversion in the regeneration subsystem relies upon an oxygen evolution reaction in a specifically tailored cell geometry and catalytic components to efficiently flow gaseous effluent out of said subsystem by means of flow channels and discrete hydrophobic/hydrophilic regions to facilitate efficient transport. The electrodes of said subsystem comprise materials chosen exclusively for efficient catalysis of the oxygen evolution reaction, wherein said materials are typically chosen from NiFe amorphous double layer hydroxides, $Co_2O_3$ spinel nanoparticles, $LaCoO_3$ perovskites, and similar compounds incorporating surface sub-micro features designed to promote the catalysis of the oxygen evolution reaction.

Efficient chemical to electrical energy conversion in the power generation subsystem relies upon an oxygen reduction reaction with specifically tailored cell geometry and catalytic components to efficiently flow oxygen into said subsystem by means of flow channels and discrete hydrophobic/hydrophilic regions to facilitate efficient air transport into a gas diffusion layer (GDL). The electrodes of said subsystem comprise materials chosen exclusively for efficient catalysis of the oxygen reduction reaction, wherein said materials are typically chosen from Pt, AgO, $MnO_2$, $La_xMn_{1-x}CoO_3$ perovskites, non-precious metal macrocycles, N-doped C, and similar compounds incorporating surface micro-features designed to heighten the performance of the catalyst layer designed to promote the oxygen reduction reaction.

Decoupled electrode design in individually optimized subsystem architectures allows for drastically dissimilar scales in the independently controlled devices.

Energy efficiency in electrochemical systems relies on the operation of devices in discrete operational modes for both charge and discharge cycles. Systems based on bi-functional (integrated power generation/regeneration) devices must mediate their performance to accommodate both reactions, and as such cannot be optimized to achieve maximum overall efficiency.

Figure 9:
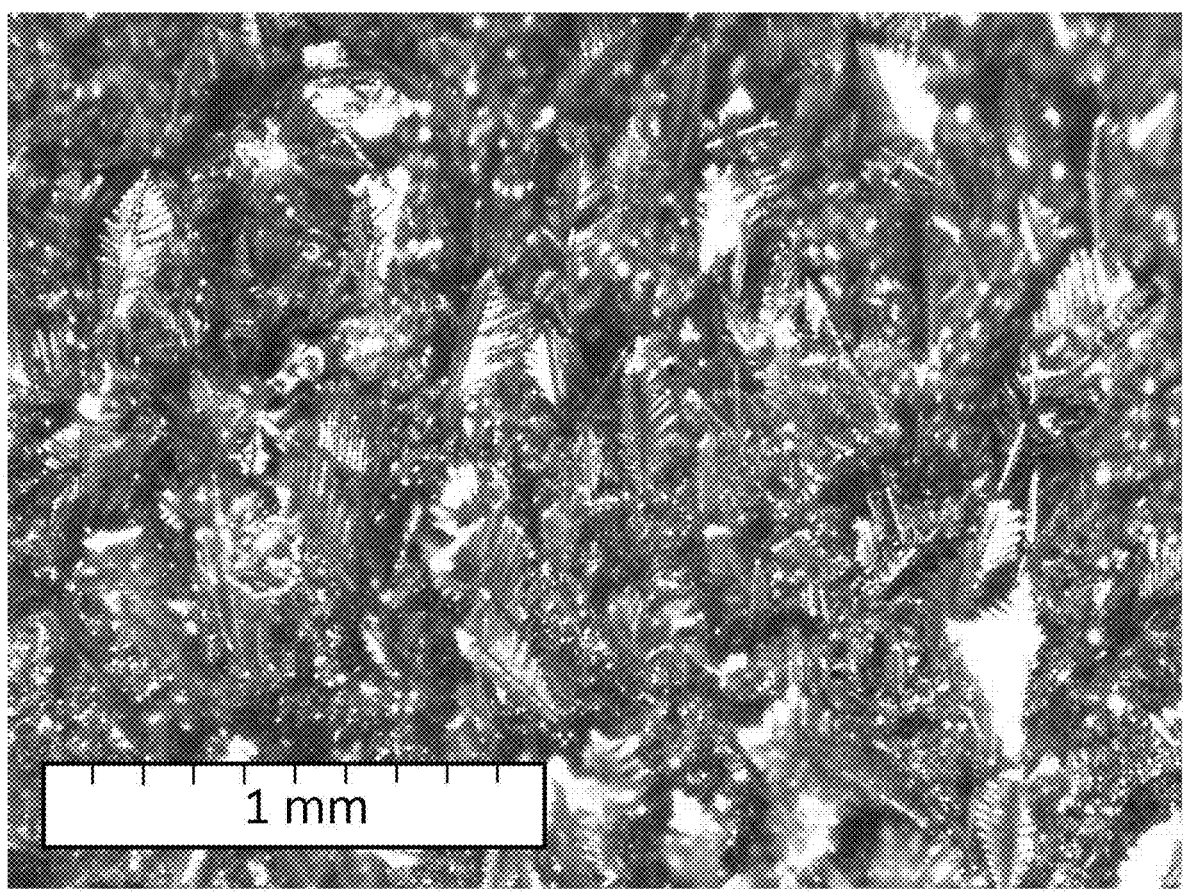
FIG. 9 is a photograph of dendritic zinc particles.

The decoupling of the generation and regeneration functions also provides flexibility in the choice of fuel employed by the system since each of said functions may be optimized to accommodate the properties of the chosen fuel. In a preferred embodiment, the system is optimized to operate with metallic particles having a dendritic morphology. These particles may have a size in the range 10 to 1000 microns and may have a relatively high ratio of surface area to weight. This property enables the particles to be easily fluidized in the bearer electrolyte and to be circulated throughout the system. In a further preferred embodiment the metallic particles are zinc particles and the bearer electrolyte is potassium hydroxide. FIG. 9 shows an example of such dendritic zinc particles.

Previous literature describing particulate zinc has documented the formation of hard pellets for zinc-air flowbattery systems. The preferred range of growth of these dense particles relies on high current density and turbulent flow regimes for compact particle regeneration. These regimes incur increased losses as compared to production methods at lower currents with still electrolyte. Dendritic particle growth occurs efficiently at comparatively lower current density and less active flow regimes.

Another advantage of dendritic particles in distributed flow systems is the transport properties of dendritic shapes as compared to compact 'boulder-like' particles. When used in such distributed systems, dendritic particles are easily fluidizable and liquefaction occurs easily. These advantages in ease of transport facilitate the scaling of distributed systems and provide for a larger range of flow rates while incurring lower energy losses for fuel transport.

The production of dendritic particles occurs in a manner in which their attachment to the regenerator electrode surface is less robust than planar plated or densely formed particulate formations. This is an advantage for methods of particle removal from the electrode surface since less energy is required for the process. Previous particle removal systems have mainly focused on physical removal of particles, such as with the use of a scraping or wiping blade, as required for well-adhered particle morphologies. These systems in physical contact with the electrode surface lead to increased surface wear and early breakdown of the system.

The use of dendritic particles in distributed flow systems is further advantageous due to their high surface area per volume ratio. The improved kinetics of dissolution of such particles provides enhanced support for higher current density devices in the power generation subsystem.

FIG. 1 is a block diagram of a regenerative fuel cell system according to one embodiment of the invention. The system [100] comprises a regenerator stack [10], a fuel storage tank [14], and a power generation stack [16]. System [100] is recharged by feeding metal ion-rich bearer electrolyte from fuel storage tank [14] into regenerator stack [10] through electrolyte conduit [20]. Electrical energy is applied to regenerator stack [10] from external source [42] to generate metallic particles of a dendritic morphology and release oxygen gas to the atmosphere [32]. The electrolyte-particle slurry so produced is then washed into fuel storage tank [14] through electrolyte conduit [21]. System [100] is discharged by feeding said electrolyte-particle slurry from fuel storage tank [14] through electrolyte conduit [24] into power generation stack [16]. Oxygen from the air [34] is also fed into power generation stack [16] and reacts with said metallic particulate fuel to provide power to a load [44]. The spent electrolyte fuel, lean with metallic particles and rich with metallic ions, is fed back to fuel storage tank [14] through electrolyte conduit [25].

In this disclosure, electrolyte "lean with metallic ions", "rich with metallic ions" and like phrases are relative terms describing the concentration of metallic ions, such as zincate ions, within the electrolyte. In particular, "lean with metallic ions" means that the metallic ion concentration of the electrolyte leaving the regeneration stack is less than the metallic ion concentration of the electrolyte when it entered the regeneration stack, and similarly "rich with metallic ions" means that the metallic ion concentration of the electrolyte leaving the power generation subsystem is greater than the metallic ion concentration of the electrolyte when it entered the power generation subsystem. Such concentration may vary in operation of the system from 0.8 moles per Litre or less to 3.8 moles per Litre or more.

Also in this disclosure, electrolyte "lean with metallic particles", "rich with metallic particles" and like phrases are relative terms describing the concentration of metallic particles within the electrolyte. In particular, "lean with metallic particles" means that the metallic particle concentration of the electrolyte leaving the power generation subsystem is less than the metallic particle concentration of the electrolyte when it entered the power generation subsystem, and similarly "rich with metallic ions" means that the metallic particle concentration of the electrolyte leaving the regeneration stack is greater than the metallic particle concentration of the electrolyte when it entered the regeneration stack. Such concentration may vary in operation of the system from 1 gram per Litre or less to 1 kilogram per Litre or more.

In some embodiments said bearer electrolyte is a concentrated solution of potassium hydroxide, said metal ion is potassium zincate and said metallic particles are zinc particles. It will be apparent to those skilled in the art that alternative bearer electrolytes and alternative metals may be employed in the invention. It will also be apparent that the terms rich and lean are relative terms that are not subject to absolute measurement.

The flow rate (Q1) between regenerator stack [10] and fuel storage tank [14] through conduits [20, 21] may be chosen for best reliability and efficiency of the metallic particle regeneration process. The flow rate (Q3) between power generation stack [16] and fuel storage tank [14] through conduits [24, 25] may be chosen for best reliability and efficiency of the metallic particle oxidation process. Thus flow rates (Q1, Q3) may be chosen for optimum performance of each individual process and need not be related to each other. Furthermore, flow rates (Q1, Q3) may be independently varied over time in order to provide the optimum conditions for the immediate operating mode of system [100]. In addition, the composition of the electrolyte/ion/particle slurry in each flow is also independent and may be altered as required. In some embodiments, the flow of electrolyte/ion/particle slurry may be induced by one or more pumps or similar devices (not shown). In some embodiments, flow rates (Q1, Q3) may be independently controlled by one or more control units [36] that control the one or more pumps or similar devices.

Figure 2:
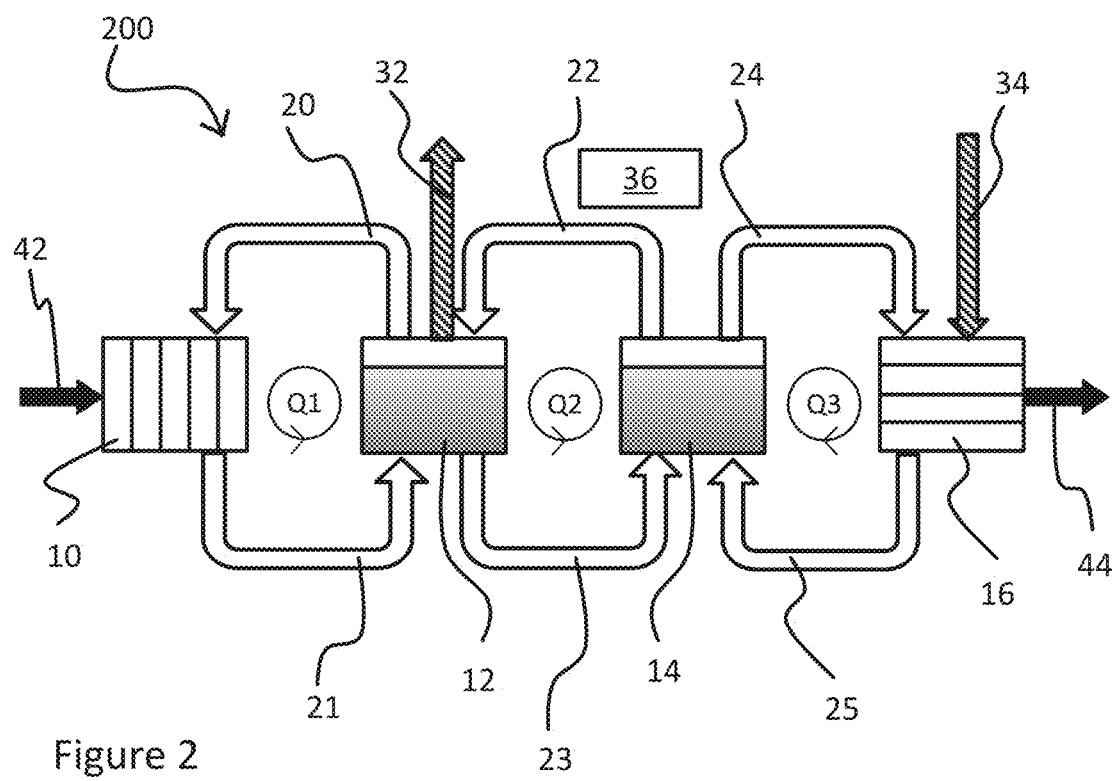
FIG. 2 is a block diagram of a regenerative fuel cell system according to an embodiment of the invention.

FIG. 2 shows another embodiment of a regenerative fuel cell system [200] according to the invention. System [200] comprises a regenerator stack [10], an intermediate tank [12], a fuel storage tank [14], and a power generation stack [16]. Intermediate tank [12] provides multiple advantages, including:

1. Providing a mechanism whereby oxygen produced by regenerator stack [10] can escape to the environment at atmospheric pressure. This capability in turn prevents a back-pressure of oxygen from building up in regenerator stack [10] and potentially destabilizing the particle regeneration reaction.
2. Enabling individual regenerator stacks [10] to be installed at different vertical heights with respect to fuel storage tank [14] while maintaining an open interface to the atmosphere.
3. Decoupling the flow rate (Q1) required to operate the regenerator stack [10] from the flow rate (Q2) required to operate fuel storage tank [14].
4. Providing a location at which the concentration of metallic particles in the electrolyte may be mediated to provide a flow of electrolyte that is substantially lean with metallic particles.

Intermediate tank [12] may be provided by way of a variety of means including, for example, one or more tanks, one or more valves, one or more pipes, and similar devices or collections of devices. In various embodiments, intermediate tank [12] may be provided as a dedicated intermediate tank [12a,12b] for a respective regenerator stack (as shown for example in FIGS. 3a, 3b and 3c), a shared sump tank [12d] for regenerator stacks each already associated with a dedicated intermediate tank (as shown for example in FIGS. 3b and 3c) and/or as a shared intermediate/sump tank [12d] for a plurality of regenerator stacks without dedicated intermediate tanks (as shown for example in FIGS. 3d and 3e).

System [200] is recharged by feeding metal ion-rich electrolyte from intermediate tank [12] into regenerator stack [10] through electrolyte conduit [20]. Electrical energy is applied to regenerator stack [10] from external source [42] to generate metallic particles of a dendritic morphology and release oxygen gas as a by-product of the reaction. The oxygen gas [32] travels through electrolyte conduit [21] and exhausts to the atmosphere at intermediate tank [12]. Intermediate tank [12] releases the generated oxygen at close to or at atmospheric pressure. The electrolyte-particle slurry produced by regenerator stack [10] also passes through conduit [21] to intermediate tank [12] and is then transferred to storage tank [14] through electrolyte conduit [23]. Intermediate tank [12] is refilled with metallic particle lean, metallic ion rich electrolyte from fuel storage tank [14] through conduit [22]. System [200] is discharged by feeding electrolyte-particle slurry through electrolyte conduit [24] into power generation stack [16]. Oxygen from the air [34] is also fed into power generation stack [10] where it reacts with the metallic particulate fuel to provide power to a load [44]. The electrolyte fuel stream, lean with metallic particles and rich with metallic ions, is fed back to fuel storage tank [14] through electrolyte conduit [25].

A flow rate (Q1) between regenerator stack [10] and intermediate tank [12] through conduits [20, 21] may be chosen for best reliability and efficiency of the metallic particle regeneration process. A flow rate (Q2) between intermediate tank [12] and fuel storage tank [14] through conduits [22, 23] may be chosen for best operation of intermediate tank [12]. The flow rate (Q3) between power generation stack [16] and fuel storage tank [14] through conduits [24, 25] may be chosen for best reliability and efficiency of the metallic particle oxidation process. Thus flow rates (Q1, Q2, Q3) may be chosen for optimum performance of each individual process and need not be related to each other. In addition, the composition of the electrolyte-particle slurry in each flow is also independent and may be altered as required. In some embodiments, the flow of electrolyte/ion/particle slurry may be induced by one or more pumps or similar devices (not shown). In some embodiments, flow rates (Q1, Q2, Q3) may be independently controlled by one or more control units [36] that control the one or more pumps or similar devices.

Figure 3A:
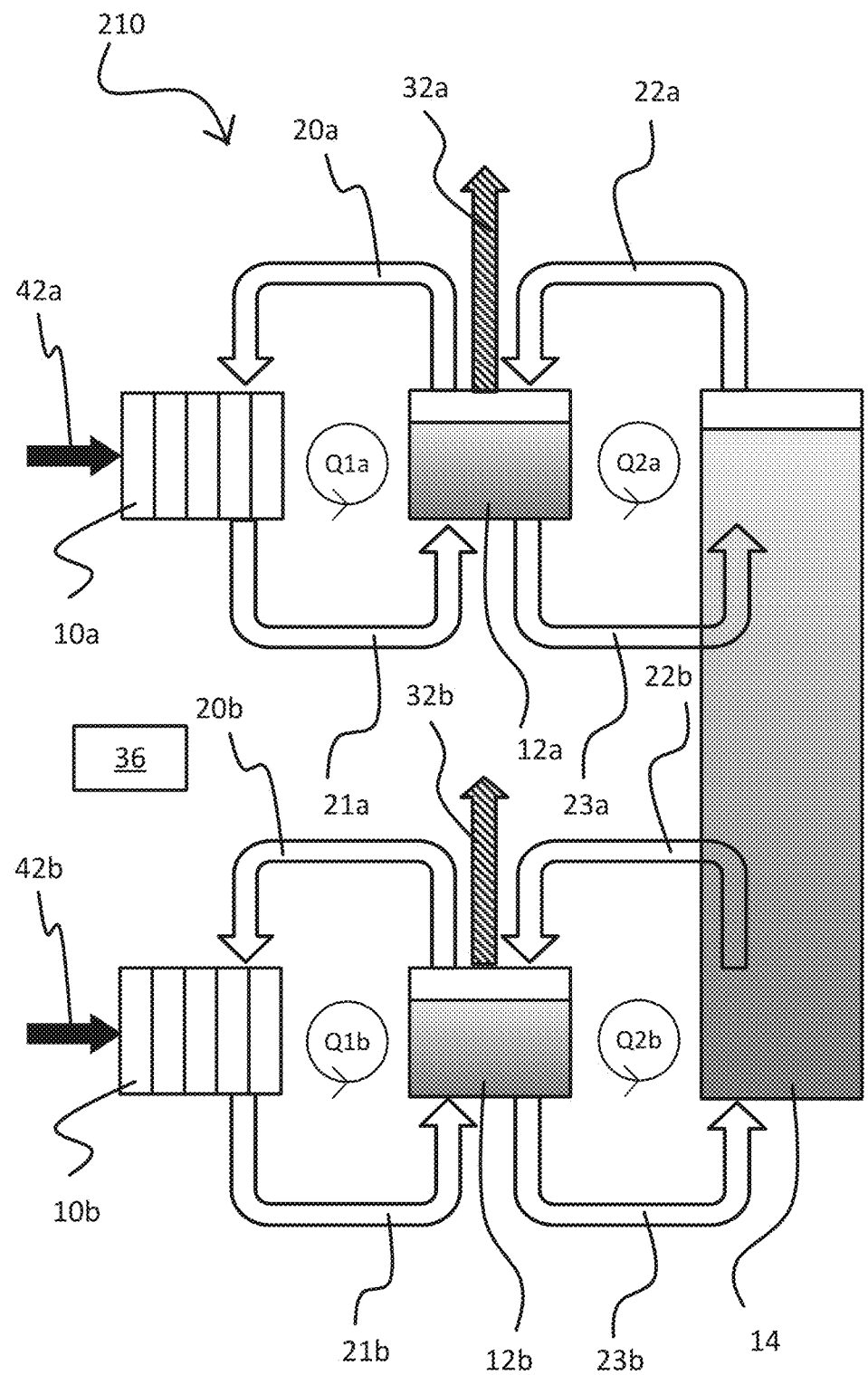
FIG. 3a is a block diagram of a regenerative fuel cell system according to an embodiment of the invention, showing a plurality of intermediate tanks and a plurality of regenerator stacks operatively connected.

FIG. 3a shows an embodiment of a particle regeneration subsystem [210] coupled to a fuel storage tank [14] according to the invention. Subsystem [210] operatively connects a plurality of regenerator stacks. Subsystem [210] comprises a plurality of regenerator stacks [10a, 10b] and one or more intermediate tanks [12a, 12b]. Subsystem [210] is operatively coupled with a fuel storage tank [14]. Subsystem [210] is recharged by feeding metal ion-rich electrolyte from intermediate tanks [12a, 12b] into regenerator stacks [10a, 10b] through electrolyte conduits [20a, 20b]. Energy is applied from external sources [42a, 42b] to generate metallic particles of a dendritic morphology and release oxygen gas as a by-product of the reaction. The oxygen gas [32a, 32b] travels through electrolyte conduit [21a, 21b] and exhausts to the atmosphere at intermediate tanks [12a, 12b]. Intermediate tanks [12a, 12b] release generated oxygen at pressures close to or at atmospheric pressure. The electrolyte-particle slurry produced by regenerator stacks [10a, 10b] also passes through conduits [21a, 21b] to intermediate tanks [12a, 12b] and is then transferred to storage tank [14] through electrolyte conduits [23a, 23b]. Intermediate tanks [12a, 12b] are refilled from fuel storage tank [14] through conduits [22a, 22b]. The provision of separate intermediate tanks [12a, 12b] enables oxygen to be released at atmospheric pressure from both units while regenerator stack [10a] and corresponding intermediate tank [12a] are physically positioned independent of the position of regenerator stack [10b] and corresponding intermediate tank [12b]. In particular the vertical positions of regenerator stacks [10a, 10b] may be independent of each other.

It will be apparent to those skilled in the art that the arrangement of said conduits is chosen to illustrate flow rates (Q1a, Q1b, Q2a and Q2b) and that the physical embodiment of said conduits may be different from that shown. It will be further apparent that the choice of two regenerator stacks is made for ease of explanation and that an alternative number of regenerator stacks and associated components are contemplated by the invention.

In operation, flow rates (Q1a, Q1b, Q2a and Q2b) are all independent of each other and may be supplied through one or more pumps or similar devices (not shown). In some embodiments, flow rates (Q1a, Q1b, Q2a and Q2b) may be independently controlled by one or more control units [36] that control the one or more pumps or similar devices. This independence of flow rates provides multiple operational advantages. Since flow rates (Q1a) and (Q1b) are independent of each other, regenerator stacks [10a] and [10b] may be operated independently and the immediate flow rate experienced by regenerator stack [10a], for example, is not influenced by the immediate flow rate experienced by regenerator stack [10b]. In some embodiments, regenerator stacks [10a, 10b] are allowed to operate in a free-running mode according to the demands of each individual stack. In some embodiments, the operation of regenerator stacks [10a] and [10b] is synchronized to a common schedule. Such synchronization may permit the total electrical demand presented through connections [42a, 42b] to be more uniform.

Further, since flow rates (Q1a) and (Q2a) are independent of each other, additional advantages may be obtained. The immediate flow rate (Q1a) required to operate regenerator stack [10a] is independent of the flow rate (Q2a) required to exchange the electrolyte-particle slurry collected in intermediate tank [12a] with fresh electrolyte present in fuel storage tank [14]. In some embodiments, in a particular mode of operation of regenerator stack [10a], it may be advantageous that flow rate (Q1a) is set to its maximum value while in another particular mode of operation of regenerator stack [10a], it may be advantageous that flow rate (Q1a) is set to zero. Thus, in some embodiments the immediate flow rate represented by (Q1a) may be varied over time but does not impose a corresponding requirement to alter the immediate value of flow rate (Q2a). Flow rate (Q2a) may be chosen to provide optimum conditions for exchange of electrolyte with storage tank [14].

In some embodiments, for the operation of particle regeneration subsystem [210] it is advantageous that the electrolyte-particle slurry contained in fuel storage tank [14] is not overly disturbed. This condition may be achieved by controlling the total flow rate presented by the sum of flows (Q2a) and (Q2b) and is not influenced by the immediate flow rates presented by flows (Q1a) and (Q1b). In some embodiments, for the operation of particle regeneration subsystem [210], the flow rates represented by the sum of flow rates (Q1a) and (Q1b) may be significantly greater than the sum of flow rates (Q2a) and (Q2b).

A further attribute of subsystem [210] is provided by the control of flow rates (Q1a) and (Q2a) in combination with the geometry of intermediate tank [12a]. It is advantageous for the operation of regenerator stack [10a] that a particle-lean flow of electrolyte may be recirculated back to regenerator stack [10a] through conduit [20a] and that a particle-rich flow of electrolyte is recirculated back to storage tank [14] through conduit [23a]. This condition may be substantially achieved by a variety of means. In one embodiment, separate control of flow rates (Q1a) and (Q2a) may permit the concentration of particles in intermediate tank [12a] to be maintained at an acceptable level by replacing the particle-rich electrolyte delivered by flow (Q1a) through conduit [21a] with particle-lean electrolyte delivered by flow (Q2a) through conduit [22a]. In another embodiment, the electrolyte-particle slurry produced by regenerator stack [10a] may be allowed to settle and separate in intermediate tank [12a]. Separate control of flow rates (Q1a) and (Q2a) may permit particle settling to occur and the geometry of intermediate tank [12a] enables flows (Q1a) and (Q2a) to be drawn from different regions of intermediate tank [12a]. In some embodiments, particle-lean flows of electrolyte may be withdrawn from upper regions of intermediate tanks [12a, 12b], and particle-rich flows of electrolyte may be withdrawn from lower regions of intermediate tanks [12a, 12b].

Figure 3B:
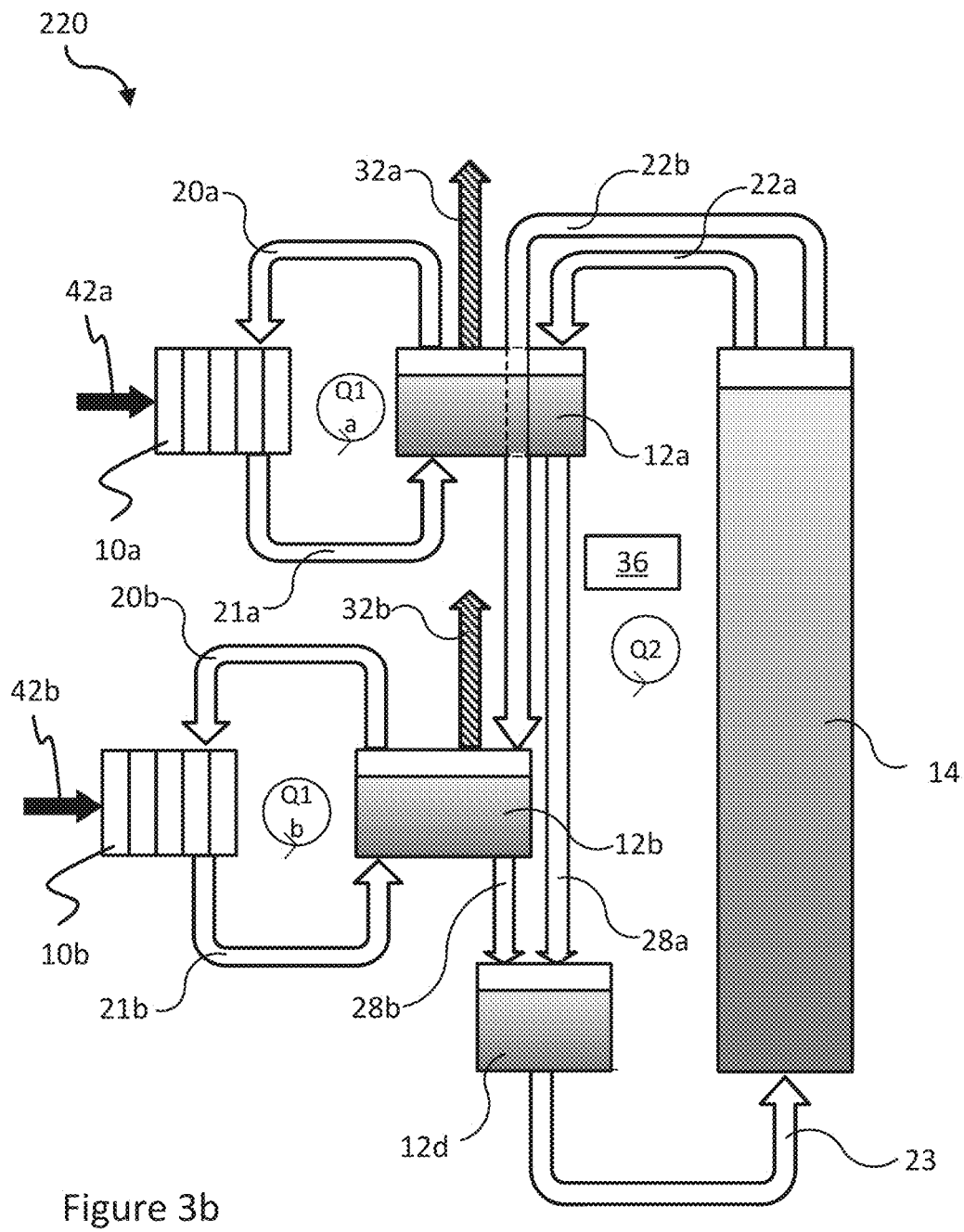
FIG. 3b is a block diagram of a regenerative fuel cell system according to an embodiment of the invention, showing a plurality of intermediate tanks, a shared sump tank and a plurality of regenerator stacks operatively connected.

FIG. 3b shows another embodiment of a particle regeneration subsystem [220] coupled to a fuel storage tank [14] according to the invention. Subsystem [220] comprises regenerator stacks [10a, 10b] and intermediate tanks [12a, 12b]. Subsystem [220] is operatively coupled with a fuel storage tank [14]. A further intermediate tank [12d] is provided. The physical positioning of intermediate tank [12d] is such that it may be described as a sump tank and this terminology will now be adopted. Sump tank [12d] is thus included in flow (Q2) to provide additional flexibility in operation. Subsystem [220] operates similarly to that described for subsystem [210] with the exception of the manner in which intermediate tanks [12a, 12b] are refilled and drained. In subsystem [220], intermediate tanks [12a, 12b] are refilled from fuel storage tank [14] through conduits [22a, 22b]. The intermediate tanks [12a, 12b] are drained to sump tank [12d] through conduits [28a, 28b]. Sump tank [12d] may then be drained by returning the electrolyte-particle slurry to fuel storage tank [14] through conduit [23]. In this manner, a single flow (Q2) is used to refill a plurality of intermediate tanks. Conduits [22a, 22b] may be connected to a single pump (not shown) through a common manifold (not shown). Moreover, the operations of filling and draining sump tank [12d] may be controlled independently by utilizing the fluid storage capacity of sump tank [12d]. A single pump or similar device (not shown) may be used to fill sump tank [12d] through conduits [22a] and [22b], intermediate tanks [12a] and [12b], and conduits [28a] and [28b]. A further pump or similar device (not shown) may be required to empty sump tank [12d] through conduit [23]. Thus flow rate (Q2) may be driven by two pumps or similar devices independent of the number of regenerator stacks serviced by said flow. In some embodiments, flow rates (Q1a, Q1b, and Q2) may be independently controlled by one or more control units [36] that control the pumps or similar devices.

Figure 3C:
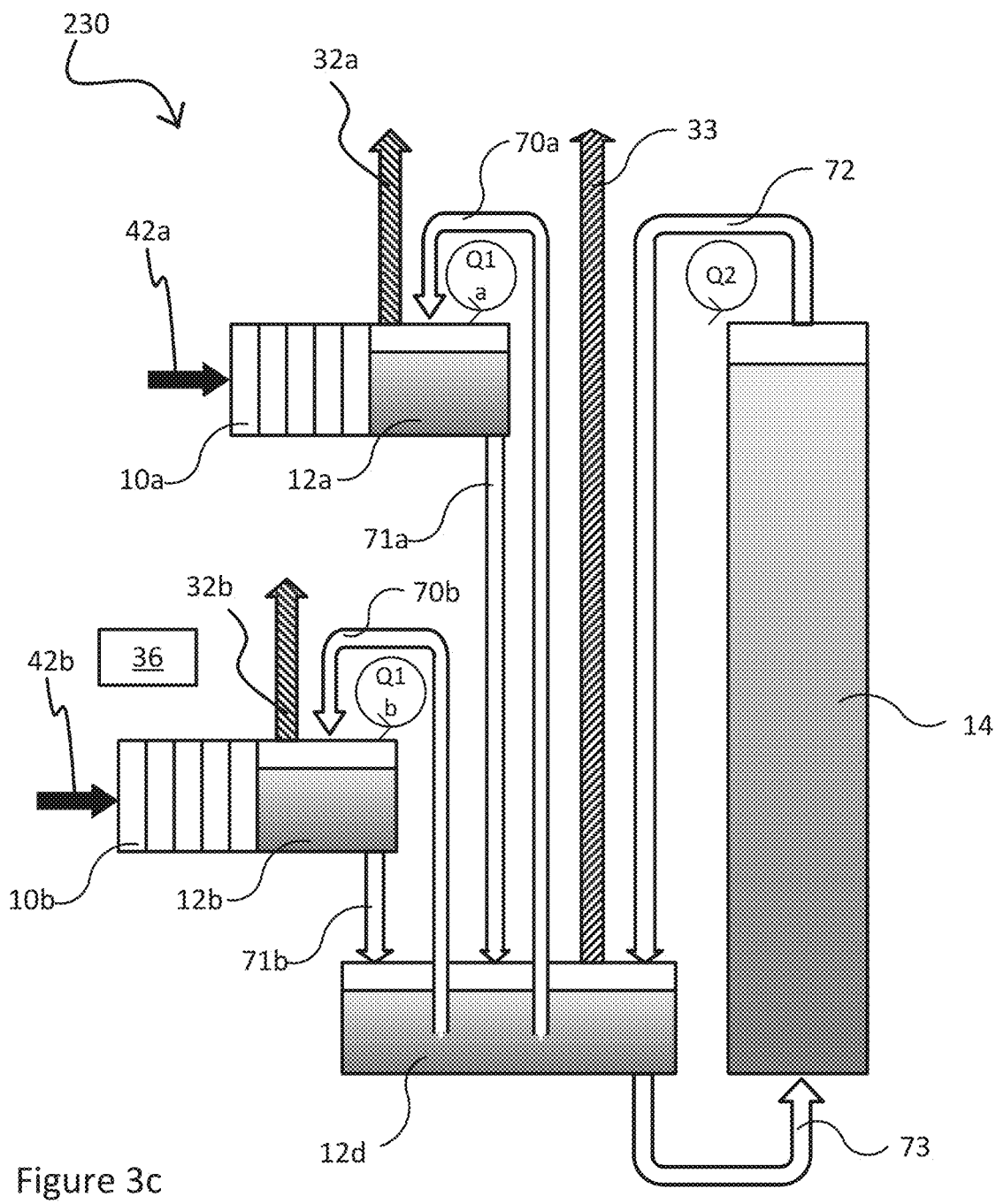
FIG. 3c is a block diagram of a regenerative fuel cell system according to an embodiment of the invention, showing a shared sump tank and a plurality of integrated intermediate tanks/regenerator stacks operatively connected.

FIG. 3c shows a further embodiment of a particle regeneration subsystem [230] coupled to a fuel storage tank [14] according to the invention. Subsystem [230] comprises regenerator stacks [10a, 10b], intermediate tanks [12a, 12b], sump tank [12d] and fuel storage tank [14]. Regenerator stacks [10a, 10b] are integrated with intermediate tanks [12a, 12b] thereby substantially eliminating the requirement for interconnecting conduits therebetween. Subsystem [230] is recharged by feeding metal ion-rich electrolyte from sump tank [12d] into intermediate tanks [12a, 12b] through electrolyte conduits [70a, 70b]. Electrolyte then flows from intermediate tanks [12a, 12b] into regenerator stacks [10a, 10b] through internal paths. Energy is applied from external source [42a, 42b] to generate metallic particles of a dendritic morphology and release oxygen gas as a by-product of the reaction. The oxygen gas travels through the connected intermediate tanks [12a, 12b], and exhausts to the atmosphere [32a, 32b]. Intermediate tanks [12a, 12b] release the generated oxygen at close to atmospheric pressure. The electrolyte-particle slurry is then transferred from intermediate tanks [12a, 12b] into sump tank [12d] through electrolyte conduits [71a, 71b]. The electrolyte-particle slurry is then delivered from sump tank [12d] to fuel storage tank [14] through electrolyte conduit [73]. The sump tank [12d] is recharged with fresh electrolyte through conduit [72]. Sump tank [12d] also provides an alternative or additional mechanism [33] whereby oxygen may be released close to or at atmospheric pressure.

It will be apparent to those skilled in the art that regenerator stacks [10a, 10b] and intermediate tanks [12a, 12b] may be loosely integrated such that their individual functions are visually apparent or may be tightly integrated such that their individual functions are not visually apparent. Furthermore, the volume of electrolyte represented by intermediate tanks [12a, 12b] may be incorporated, in whole or in part, in the volume of electrolyte represented by regenerator stack [10].

In one embodiment, an individual pump or similar device (not shown) is used to provide flow (Q1a) for regenerator unit [10a] through conduit [70a], a further or similar device pump (not shown) is used to provide flow (Q1b) for regenerator unit [10b] through conduit [70b], and a yet further pump or similar device (not shown) is used to drain sump tank [12d] through conduit [73] and a still further pump or similar device (not shown) is used to fill sump tank [12d] through conduit [72]. In some embodiments, one or more control units [36] independently control these pumps or similar devices.

The arrangement of particle regeneration subsystem [230] thereby provides a system and method whereby:

(a) oxygen is released near or at atmospheric pressure;
(b) the concentration of metallic particulate fuel in the bearer electrolyte may be mediated by a process of dilution or settling or similar means to produce a particle-lean bearer electrolyte;
(c) the metallic particulate fuel is delivered to a fuel storage tank;
(d) the particle-lean bearer electrolyte is recirculated through one or a plurality of regenerator stacks;
(e) the flow of bearer electrolyte from the fuel storage tank may be distributed to one or a plurality of regenerator stacks;
(f) the flow of bearer electrolyte from the fuel storage tank is decoupled from the flow of electrolyte to the one or a plurality of regenerator stacks; and
(g) the one or a plurality of regenerator stacks may be operated independently;

and is described as follows. In step (a), oxygen may be released to the atmosphere at integrated intermediate tanks [12a, 12b] or at sump tank [12d] or at a combination thereof. In step (b), the metallic particulate fuel may be diluted with fresh bearer electrolyte at integrated intermediate tanks [12a, 12b] or at sump tank [12d] or at a combination thereof. Optionally, in step (b), the metallic particulate fuel may be allowed to substantially settle out of the bearer electrolyte at integrated intermediate tanks [12a, 12b] or at sump tank [12d] or at a combination thereof. In step (c), the metallic particulate fuel may be delivered from integrated intermediate tanks [12a, 12b] to sump tank [12d] wherein additional concentration or settling may occur prior to delivery to fuel storage tank [14]. In step (d), a particle-lean bearer electrolyte may be recirculated from sump tank [12d] to regenerator stacks [10a, 10b] through intermediate tanks [12a, 12b]. The recirculation of electrolyte need not be constant but can be timed to facilitate the separation of the metallic particulate fuel from the bearer electrolyte. In step (e), the flow of bearer electrolyte from storage tank [14] is first delivered to sump tank [12d] and then may be distributed to regenerator stacks [10a, 10b] through conduits [70a, 70b]. The distribution of the bearer electrolyte may be performed simultaneously to all regenerator stacks or may be performed individually at separate times. In step (f) the flow of bearer electrolyte from fuel storage tank [14] to regenerator stacks [10a, 10b] is decoupled by the volume of bearer electrolyte held in intermediate tanks [12a, 12b] and sump tank [12d], and by the separation of flows (Q2) and (Q1a, Q1b). In step (g), independent operation, as between regenerator stacks [10a, 10b], and as between regenerator stacks [10a, 10b]/sump tank [12d] and fuel storage tank [14]/sump tank [12d], is enabled by one or more of the preceding steps.

Figure 3D:
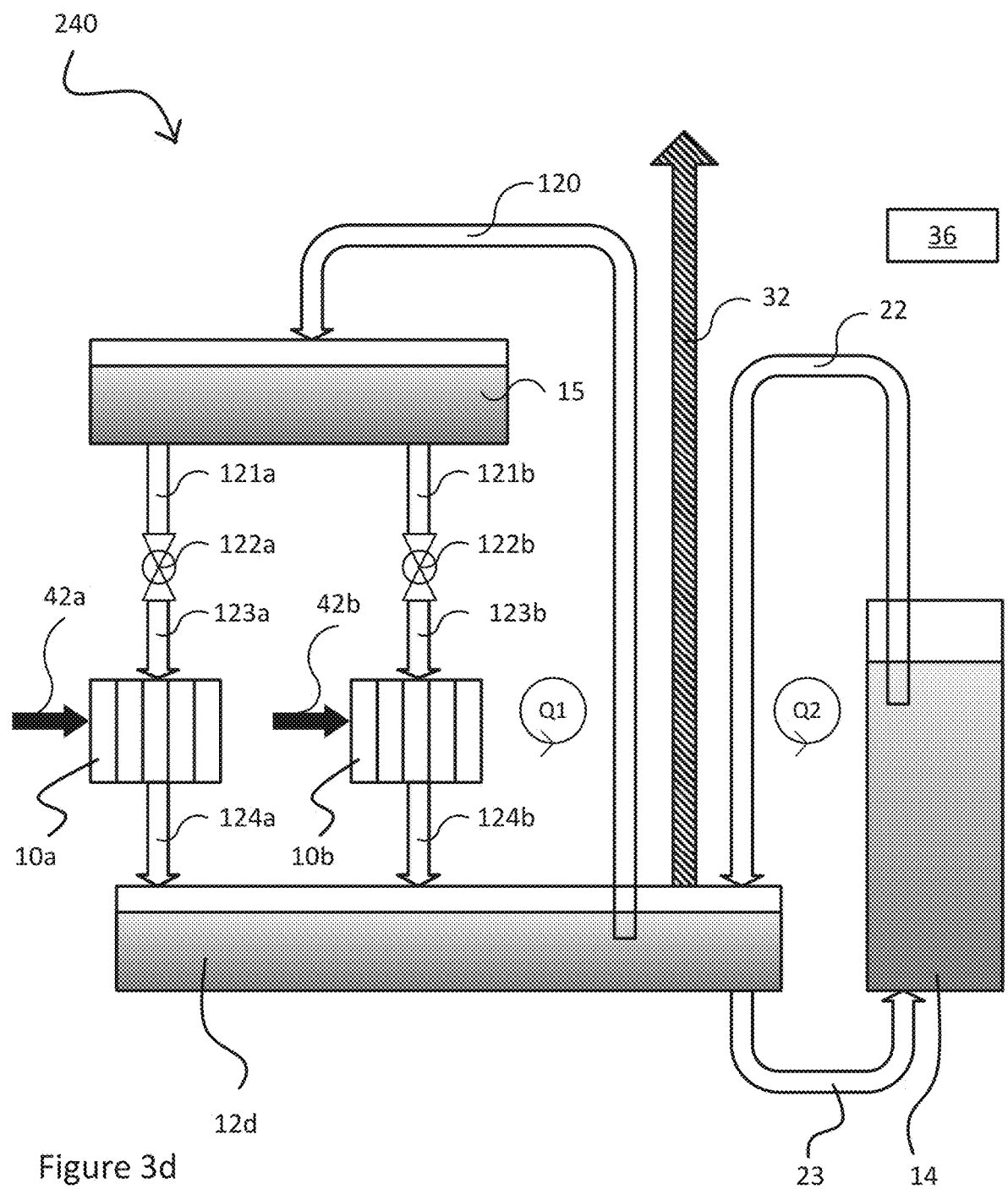
FIG. 3d is a block diagram of a regenerative fuel cell system according to an embodiment of the invention, showing a header tank, a shared intermediate/sump tank and a plurality of regenerator stacks operatively connected.

FIG. 3d shows an embodiment of a particle regeneration subsystem [240] coupled to a fuel storage tank [14] according to the invention. Subsystem [240] comprises a plurality of regenerator stacks [10a, 10b], a header tank [15] and an intermediate tank [12d], operatively connected. The nature and physical positioning of intermediate tank [12d] is such that it may be described as an intermediate/sump tank and this terminology will now be adopted. Subsystem [240] is operatively coupled with a fuel storage tank [14]. Subsystem [240] is recharged by feeding metal ion-rich electrolyte from intermediate/sump tank [12d] into header tank [15] through electrolyte conduit [120]. Energy is applied to regenerator stacks [10a, 10b] from external sources [42a, 42b] to generate metallic particles of a dendritic morphology and release oxygen gas as a by-product of the reaction. The oxygen gas travels through electrolyte conduits [124a, 124b] to intermediate/sump tank [12d]. The oxygen gas [32] exhausts to the atmosphere at intermediate/sump tank [12d]. Intermediate/sump tank [12d] releases the generated oxygen at pressures close to or at atmospheric pressure. The electrolyte-particle slurry produced by regenerator stacks [10a, 10b] also passes through conduits [124a, 124b] to intermediate/sump tank [12d] and is then transferred to storage tank [14] through electrolyte conduit [23]. Intermediate/sump tank [12d] is refilled from fuel storage tank [14] through conduit [22]. The provision of header tank [15] and intermediate/sump tank [12d] enables oxygen to be released at atmospheric pressure from both regenerator stacks while regenerator stack [10a] is physically positioned independent of the position of regenerator stack [10b]. In particular, the vertical positions of regenerator stacks [10a, 10b] may be independent of each other.

Regenerator stack [10a] is supplied with electrolyte from header tank [15] through electrolyte conduit [121a], valve [122a] and electrolyte conduit [123a]. Regenerator stack [10b] is supplied with electrolyte from header tank [15] through electrolyte conduit [121b], valve [122b] and electrolyte conduit [123b]. The provision of valves [122a, 122b] enables the flow of electrolyte to regenerator stacks [10a, 10b] to be controlled independently.

It will be apparent to those skilled in the art that the arrangement of said conduits is chosen to illustrate flow rates (Q1 and Q2) and that the physical embodiment of said conduits may be different from that shown. It will be further apparent that the choice of two regenerator stacks is made for ease of explanation and that an alternative number of regenerator stacks and associated components are contemplated by the invention.

In operation, flow rates (Q1 and Q2) are independent of each other and may be supplied through one or more pumps or similar devices (not shown). In some embodiments, flow rates (Q1 and Q2) may be independently controlled by one or more control units [36] that control the one or more pumps or similar devices. Furthermore, flow rate (Q1) is itself composed of a plurality of conduit segments that can also be operated independently. Conduit segment [120] operates to supply electrolyte from intermediate/sump tank [12d] to header tank [15]. Conduit segment [123a] operates to supply electrolyte from header tank [15] to regenerator stack [10a]. Conduit segment [124a] operates to supply electrolyte-particle slurry and generated oxygen from regenerator stack [10a] to intermediate/sump tank [12d]. Conduit segment [123b] operates to supply electrolyte from header tank [15] to regenerator stack [10b]. Conduit segment [124b] operates to supply electrolyte-particle slurry and generated oxygen from regenerator stack [10b] to intermediate/sump tank [12d]. This independence of electrolyte flow provides multiple operational advantages. Since the flows through conduit segments [123a] and [123b] are independent of each other, regenerator stacks [10a] and [10b] may be operated independently and the immediate flow rate experienced by regenerator stack [10a], for example, is not influenced by the immediate flow rate experienced by regenerator stack [10b]. In some embodiments, regenerator stacks [10a, 10b] are allowed to operate in a free-running mode according to the demands of each individual stack. In some embodiments, the operation of regenerator stacks [10a] and [10b] is synchronized to a common schedule. Such synchronization may permit the total electrical demand presented through connections [42a, 42b] to be more uniform. Such synchronization may also permit the flow of electrolyte from intermediate/sump tank [12d] to header tank [15] to be more uniform. In some embodiments, header tank [15] is supplied with electrolyte from intermediate/sump tank [12d] by a single pump (not shown) operating through conduit [120]. In some embodiments, header tank [15] is supplied with electrolyte from intermediate/sump tank [12d] by a plurality of pumps operating through one or a plurality of conduits. In some embodiments, regenerator stacks [10a, 10b] are supplied with electrolyte through conduits [123a, 123b] by the force of gravity operating on the electrolyte contained in header tank [15].

Further, since flow rates (Q1) and (Q2) are independent of each other, additional advantages may be obtained. The immediate flow rate (Q1) required to operate regenerator stacks [10a, 10b] is independent of the flow rate (Q2) required to exchange the electrolyte-particle slurry collected in intermediate/sump tank [12d] with fresh electrolyte present in fuel storage tank [14]. In some embodiments, in a particular mode of operation of regenerator stacks [10a, 10b], it may be advantageous that flow rate (Q1) is set to its maximum value while in another particular mode of operation of regenerator stacks [10a, 10b], it may be advantageous that flow rate (Q1) is set to zero. Thus, in some embodiments the immediate flow rate represented by (Q1) may be varied over time but does not impose a corresponding requirement to alter the immediate value of flow rate (Q2). Flow rate (Q2) may be chosen to provide optimum conditions for exchange of electrolyte with storage tank [14].

In some embodiments, for the operation of particle regeneration subsystem [240], it is advantageous that the electrolyte-particle slurry contained in fuel storage tank [14] is not overly disturbed. This condition may be achieved by limiting the flow rate presented by (Q2) and is not influenced by the immediate flow rate presented by flow (Q1). In some embodiments, for the operation of particle regeneration subsystem [240], the total flow rate represented by (Q1) may be significantly greater than the flow rate represented by (Q2).

A further attribute of subsystem [240] is provided through the control of flow rates (Q1) and (Q2) in combination with the geometry of intermediate/sump tank [12d]. It is advantageous for the operation of regenerator stacks [10a, 10b] that a particle-lean flow of electrolyte may be delivered to regenerator stacks [10a, 10b] through conduits [123a, 123b] and that a particle-rich flow of electrolyte is recirculated back to storage tank [14] through conduit [23]. This condition may be substantially achieved by a variety of means. In one embodiment, separate control of flow rates (Q1) and (Q2) may permit the concentration of particles in intermediate/sump tank [12d] to be maintained at an acceptable level by replacing the particle-rich electrolyte delivered by flow (Q1) through conduits [124a, 124b] with particle-lean electrolyte delivered by flow (Q2) through conduit [22]. In another embodiment, the electrolyte-particle slurry produced by regenerator stacks [10a, 10b] may be allowed to settle and separate in intermediate/sump tank [12d]. Separate control of flow rates (Q1) and (Q2) may permit particle settling to occur and the geometry of intermediate/sump tank [12d] enables flows (Q1) and (Q2) to be drawn from different regions of intermediate/sump tank [12d]. In some embodiments, particle-lean flows of electrolyte may be withdrawn from the upper regions of intermediate/sump tank [12d], and particle-rich flows of electrolyte may be withdrawn from lower regions of intermediate/sump tank [12d].

The arrangement of particle regeneration subsystem [240] thereby provides a system and method whereby:

(a) particle-rich bearer electrolyte is delivered to an intermediate/sump tank from one or a plurality of regenerator stacks;

(b) oxygen is released near or at atmospheric pressure;

(c) the concentration of metallic particulate fuel in the bearer electrolyte may be mediated by a process of dilution or settling or similar means to produce a particle-lean bearer electrolyte;

(d) the particle-lean bearer electrolyte is recirculated through a header tank;

(e) the particle-lean bearer electrolyte is distributed to the one or a plurality of regenerator stacks;

(f) the metallic particulate fuel is delivered to a fuel storage tank;

(g) the particle-lean bearer electrolyte is replenished from the fuel storage tank;

(h) the flow of bearer electrolyte from the fuel storage tank is decoupled from the flow of electrolyte to the one or a plurality of regenerator stacks; and (i) the one or a plurality of regenerator stacks may be operated independently; and is described as follows. In step (a), the operation of regenerator stacks [10a, 10b] delivers particle-rich bearer electrolyte and oxygen gas to intermediate/sump tank [12d]. In step (b), oxygen may be released to the atmosphere at intermediate/sump tank [12d]. In step (c), the particle-rich bearer electrolyte may be diluted with fresh bearer electrolyte at intermediate/sump tank [12d]. Optionally, in step (c), the metallic particulate fuel may be allowed to substantially settle out of the bearer electrolyte at intermediate/sump tank [12d]. In step (d), a particle-lean bearer electrolyte may be recirculated through header tank [15]. The recirculation of electrolyte need not be constant but can be timed to facilitate the separation of the metallic particulate fuel from the bearer electrolyte. In step (e), a particle-lean bearer electrolyte may be distributed from header tank [15] to regenerator stacks [10a, 10b]. The distribution of the bearer electrolyte may be performed simultaneously to all regenerator stacks or may be performed individually at separate times. In step (f), the metallic particulate fuel may be delivered from intermediate/sump tank [12d] to fuel storage tank [14]. In step (g), the flow of particle-lean bearer electrolyte from storage tank [14] is delivered to intermediate/sump tank [12d] through conduit [22]. In step (h) the flow of bearer electrolyte from fuel storage tank [14] to regenerator stacks [10a, 10b] is decoupled by the volume of bearer electrolyte held in intermediate/sump tank [12d] and header tank [15], and by the separation of flows (Q2) and (Q1). In step (i), independent operation, as between regenerator stacks [10a, 10b], and as between regenerator stacks [10a, 10b]/intermediate/sump tank [12d] and fuel storage tank [14]/intermediate/sump tank [12d], is enabled by one or more of the preceding steps.

Figure 3E:
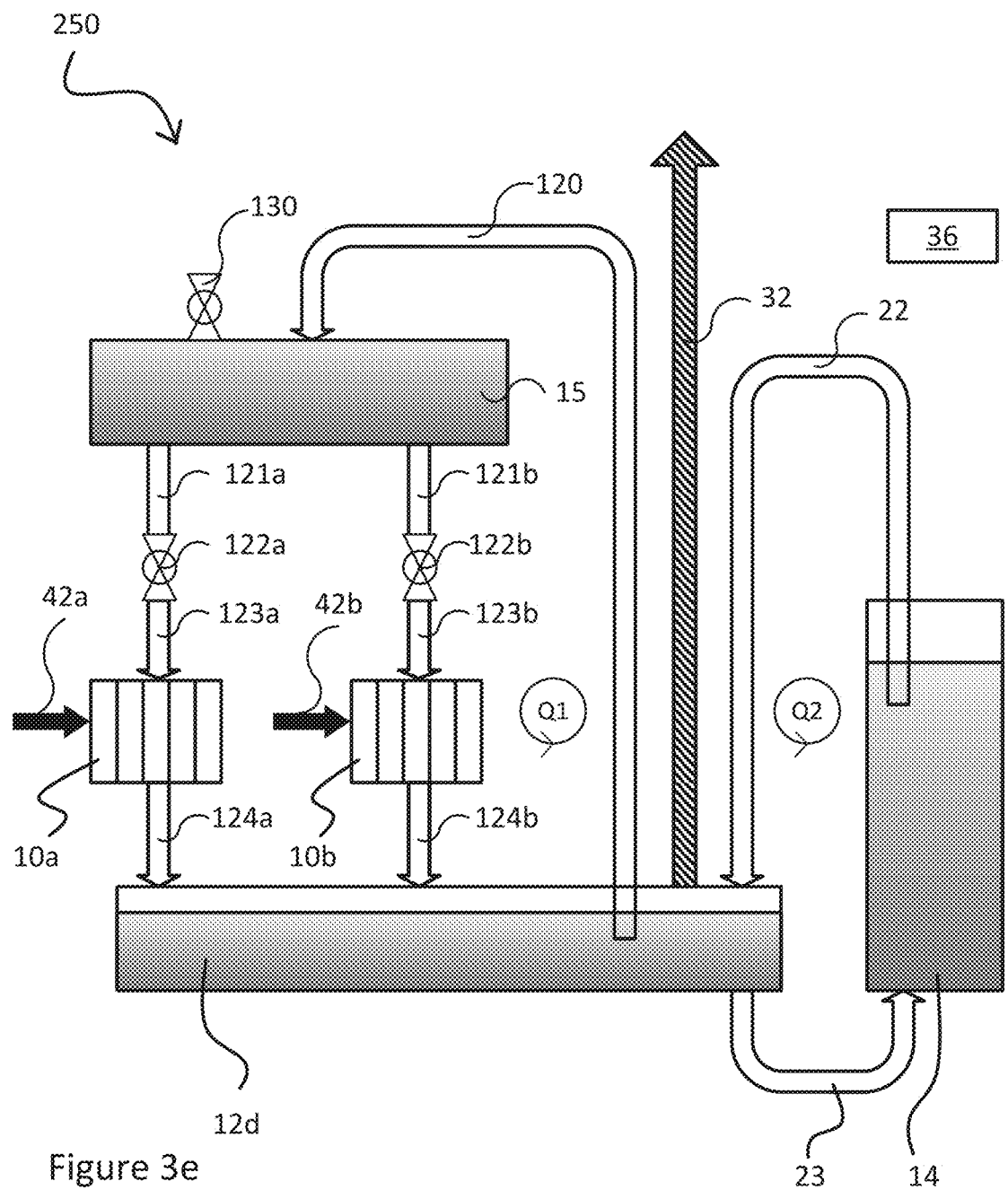
FIG. 3e is a block diagram of a regenerative fuel cell system according to an embodiment of the invention, showing a header tank equipped with a check valve, a shared intermediate/sump tank and a plurality of regenerator stacks operatively connected.

FIG. 3e is a block diagram of a particle regeneration subsystem according to an embodiment of the invention, showing a header tank, an intermediate/sump tank and a plurality of regenerator stacks operatively connected. Subsystem [250] comprises all the elements of subsystem [240] and further comprises the addition of check valve [130] to header tank [15]. The inclusion of check valve [130] has advantage in reducing the energy required to fill header tank [15] with electrolyte.

When the system is being primed with electrolyte, valves [122a, 122b] are closed, check valve [130] is open and electrolyte is supplied from intermediate/sump tank [12d] to header tank [15] through conduit [120] by a pump (not shown). During this process, air in header tank [15] is displaced by electrolyte and is exhausted to the atmosphere through check valve [130]. Once header tank [15] is full of electrolyte, the reseal pressure of check valve [130] is reached and the check valve is closed.

When it is necessary to flow electrolyte through, for example, regenerator [10a], valve [122a] is opened and check valve [130] remains closed. The pressure of fluid in header tank [15] causes a flow of electrolyte through elements [121a, 122a, 123a, 10a and 124a]. Conduit [124a] is sized such that closed channel flow is achieved. The suction caused by closed channel flow causes replacement fluid to be drawn into header tank [15] through conduit [120], thereby reducing the pumping power otherwise required to refill header tank [15]. In some embodiments, header tank [15] may be maintained in a substantially full condition and may operate as a manifold for supplying electrolyte to a plurality of regenerator stacks.

Each of the arrows indicating flow between components in FIGS. 1, 2, and 3a to 3e is independently selectable by one or more control units to optimize electro-depositing metallic particulate material within the regenerator stack and/or generating electricity by discharging the metallic particulate material within the power generation stack.

It will be apparent to those skilled in the art that subsystems [210, 220, 230, 240, 250] are not exhaustive and that the features thereof may be employed in combination.

Figure 4:
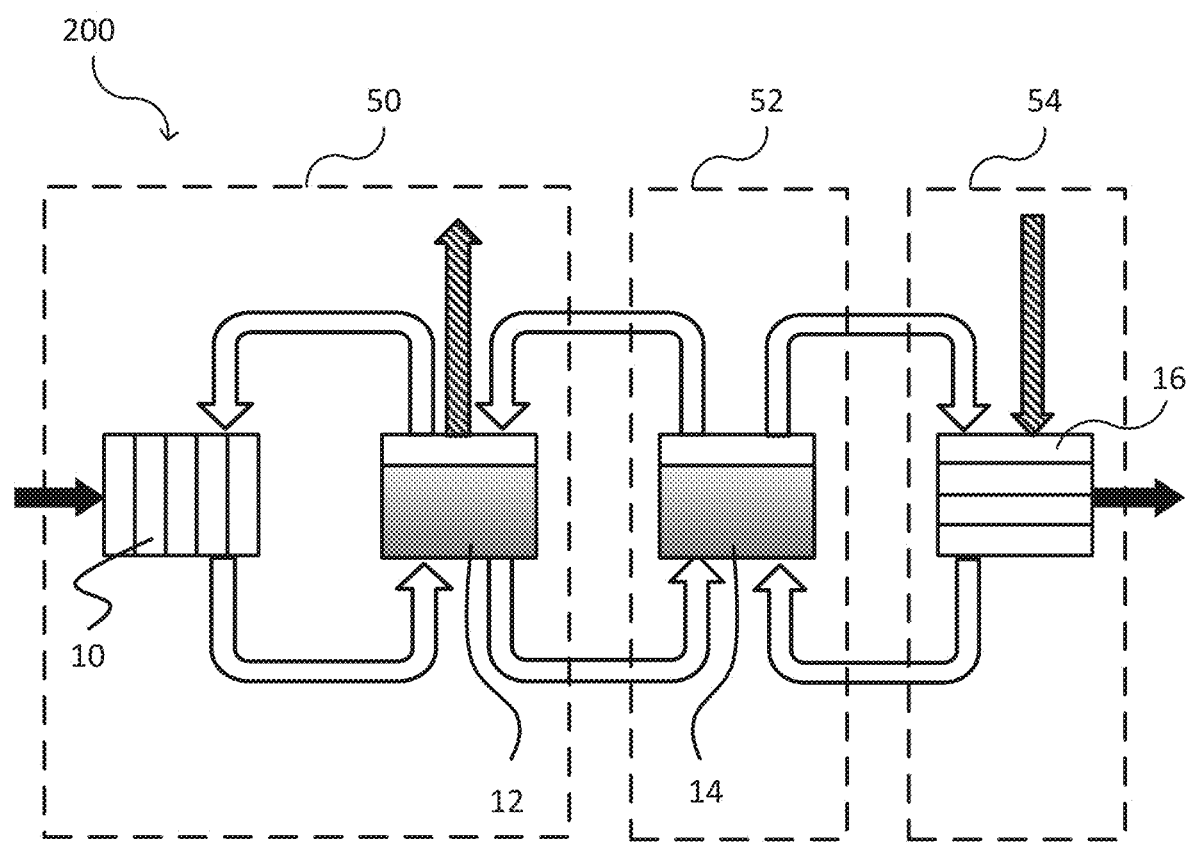
FIG. 4 is a block diagram of a regenerative fuel cell system according to an embodiment of the invention, showing the system partitioned into separate physical structures.

FIG. 4 shows a regenerative fuel cell system [200] according to an embodiment of the invention. The components of system [200] are partitioned into separate physical structures. Each structure may be assembled independently and may be described as a compartment, cabinet, rack, bay or similar embodiment. In the illustrated embodiment, one or more regenerator stacks [10] and intermediate tanks [12] are located within particle regeneration subsystem (PRS) [50], one or more fuel storage tanks [14] are located within fuel storage subsystem (FSS) [52], and one or more power generation stacks [16] are located within power generation subsystem (PGS) [54]. It will be apparent to those skilled in the art that each structure [50, 52, 54], hereinafter referred to as a bay, may also be duplicated to produce an even larger system. It will also be apparent to those skilled in the art that each structure [50, 52, 54] may be positioned independently and may be separated from each other. In one embodiment, each structure [50, 52, 54] is assembled within a separate intermodal container and said containers are located close to one another. In another embodiment, each intermodal container may be located at a separate site.

Figure 5A:
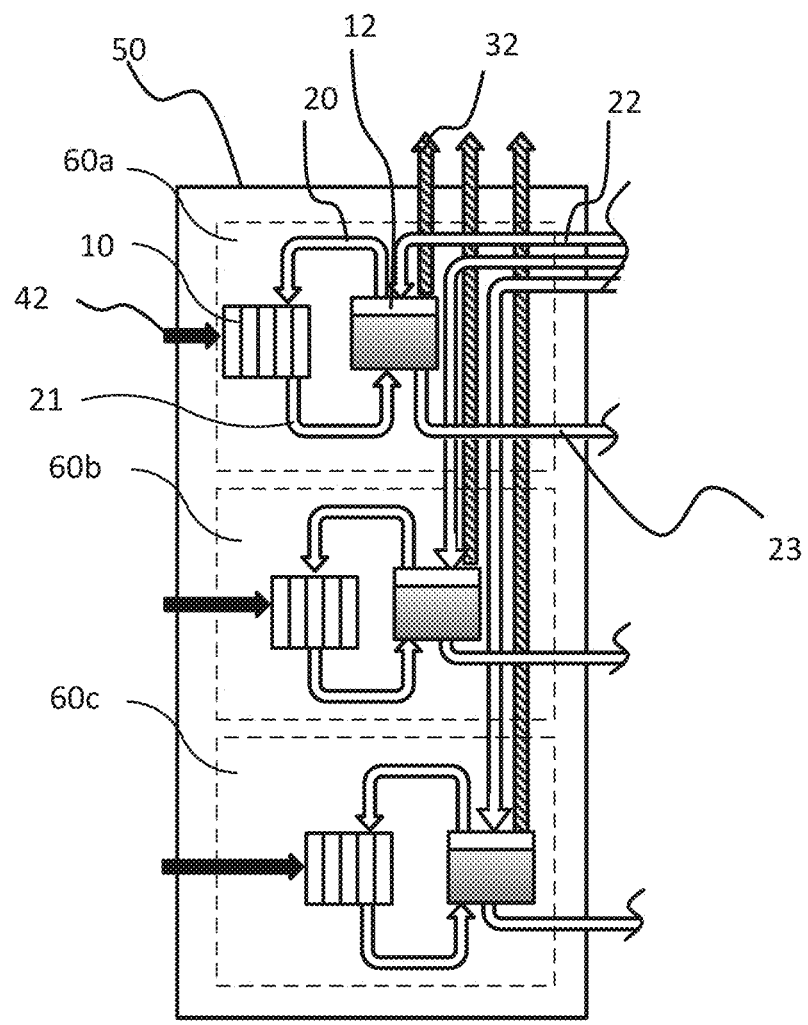
FIG. 5a is a block diagram of a particle regeneration subsystem bay according to an embodiment of the invention, the bay housing a plurality of regenerator stacks.

FIG. 5a shows a particle regeneration subsystem (PRS) bay [50] according to an embodiment of the invention. PRS bay [50] houses one or more regenerator stacks [10] and associated components. The PRS operates as described previously; the PRS regenerates stored energy by feeding metal ion-rich electrolyte into regenerator stack [10] through electrolyte conduit [20] and through intermediate tank [12]. Intermediate tank [12] is integral to releasing the generated oxygen at close to atmospheric pressure. Energy is applied from an external source [42] to generate metallic particles of a dendritic morphology and release oxygen gas as a by-product of the reaction. The oxygen gas travels through electrolyte conduit [21], through the connected intermediate tank [12], and exhausts to the atmosphere [32]. The electrolyte-particle slurry is then transferred to fuel storage tank [14] through electrolyte conduit [23]. Each complete regenerator stack and associated intermediate tank is housed in a sub-compartment [60a, 60b, 60c] of PRS bay [50]. The physical arrangement of each sub-compartment [60a] can be placed independently of additional sub-compartments [60b, 60c] through the incorporation of the individual intermediate tanks [12].

It will be apparent to those skilled in the art that the choice of three regenerator stacks is made for ease of explanation and that an alternative number of regenerator stacks is contemplated by the invention. In a particular embodiment the number of regenerator stacks located in a single bay may range from one to sixteen and the number of electrolytic cells in each regenerator stack may range from one to forty or more. In an application in which rapid recharging of the system is required (such as when solar energy is the only available source), the capacity of the PRS bay may exceed that of the PGS bay. In some embodiments, the ratio of PRS power to PGS power may range from 8:1 to 1:8. In some embodiments, the ratio may be 8:1, 4:1, 2:1, 1:1, 1:2, 1:4 or 1:8.

Figure 5B:
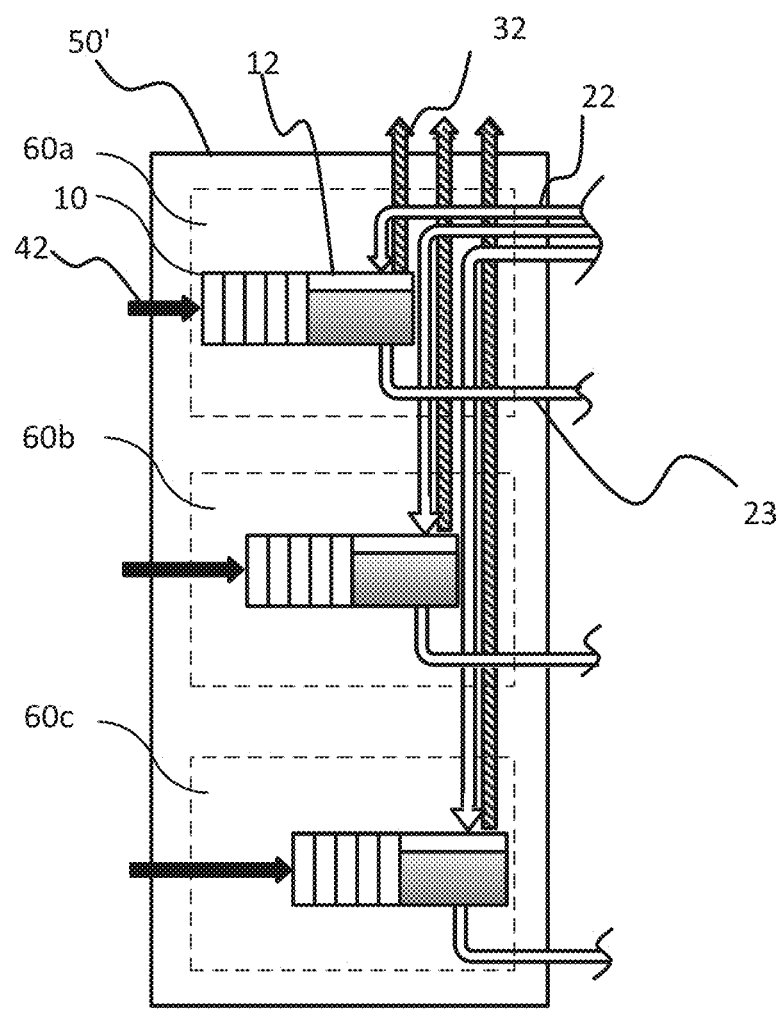
FIG. 5b is a block diagram of a particle regeneration subsystem bay according to an embodiment of the invention, the bay housing a plurality of regenerator stacks incorporating integrated intermediate tanks.

FIG. 5b shows a particle regeneration subsystem (PRS) bay [50'] according to an embodiment of the invention. PRS bay [50'] houses one or more integrated regenerator stacks [10]/intermediate tanks [12] and associated components. The PRS operates substantially as described previously; the PRS regenerates stored energy by feeding metal ion-rich electrolyte into an integrated regenerator stack [10]/intermediate tank [12] through electrolyte conduit [22]. The integrated regenerator stack [10]/intermediate tank [12] releases the generated oxygen at pressures close to atmospheric pressure. Energy is applied from an external source [42] to generate metallic particles of a dendritic morphology and release oxygen gas which exhausts to the atmosphere [32]. The electrolyte-particle slurry is then transferred to fuel storage tank [14] through electrolyte conduit [23]. Each complete regenerator stack and integrated intermediate tank is housed in a sub-compartment [60a, 60b, 60c] of particle regeneration subsystem bay [50']. The physical arrangement of each sub-compartment [60a] can be placed independently of additional sub-compartments [60b, 60c] through incorporation of the integrated intermediate tanks [12].

Figure 5C:
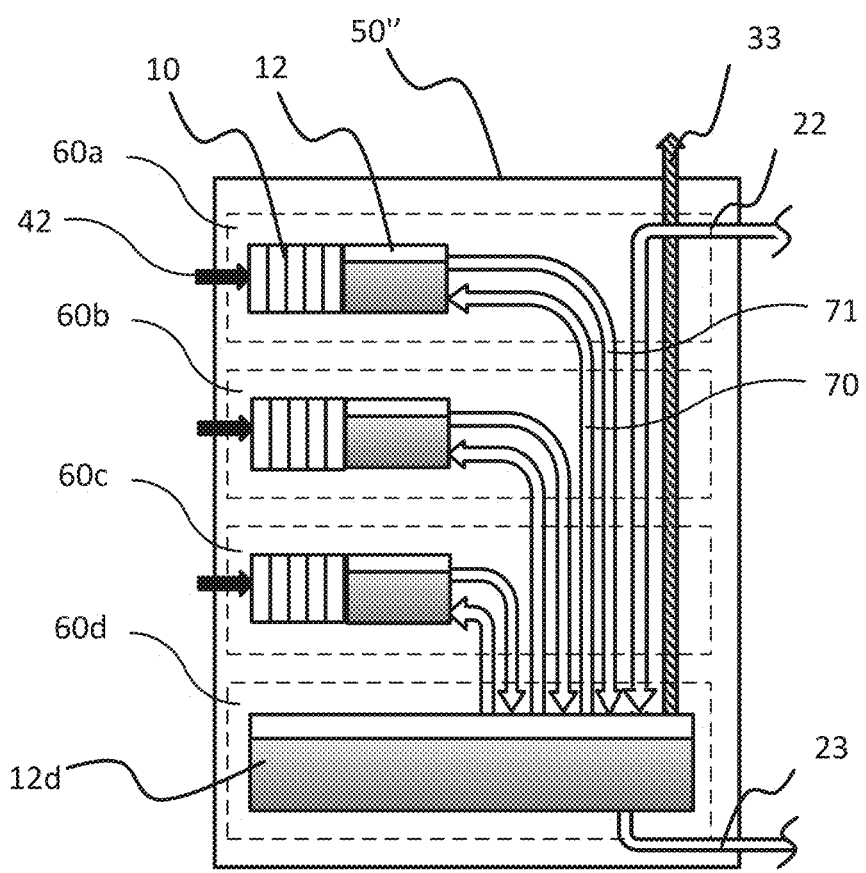
FIG. 5c is a block diagram of a particle regeneration subsystem bay according to an embodiment of the invention, the bay housing a plurality of regenerator stacks incorporating integrated intermediate tanks and a shared sump tank.

FIG. 5c shows a particle regeneration subsystem (PRS) bay [50"] according to an embodiment of the invention. PRS bay [50"] houses one or more integrated regenerator stacks [10]/intermediate tanks [12] and associated components, and further utilizes a shared sump tank [12d]. The PRS operates substantially as described previously; the PRS regenerates stored energy by feeding metal ion-rich electrolyte from sump tank [12d] into integrated regenerator stack [10]/ intermediate tank [12] through electrolyte conduit [70]. Electrical energy is applied from an external source [42] to generate metallic particles of a dendritic morphology and release oxygen gas as a by-product of the reaction. The oxygen gas travels through integrated regenerator stack [10]/intermediate tank [12] and electrolyte-particle slurry conduit [71] and exhausts to the atmosphere [33] at sump tank [12d]. The sump tank releases generated oxygen at pressures close to atmospheric pressure. The electrolyte-particle slurry is then transferred to fuel storage tank [14] through electrolyte conduit [23]. Sump tank [12d] is refilled from fuel storage tank [14] through conduit [22]. Each complete regenerator stack and integrated intermediate tank is housed in a sub-compartment [60a, 60b, 60c] of particle regeneration subsystem bay [50″]. The physical arrangement of each sub-compartment [60a] can be placed independently of additional sub-compartments [60b, 60c] through incorporation of the integrated intermediate tanks [12]. The shared sump tank [12d] is located in the lowest compartment [60d] or in a position equivalent to the lowest [60c] regenerator stack in relation to gravitational positioning.

Figure 5D:
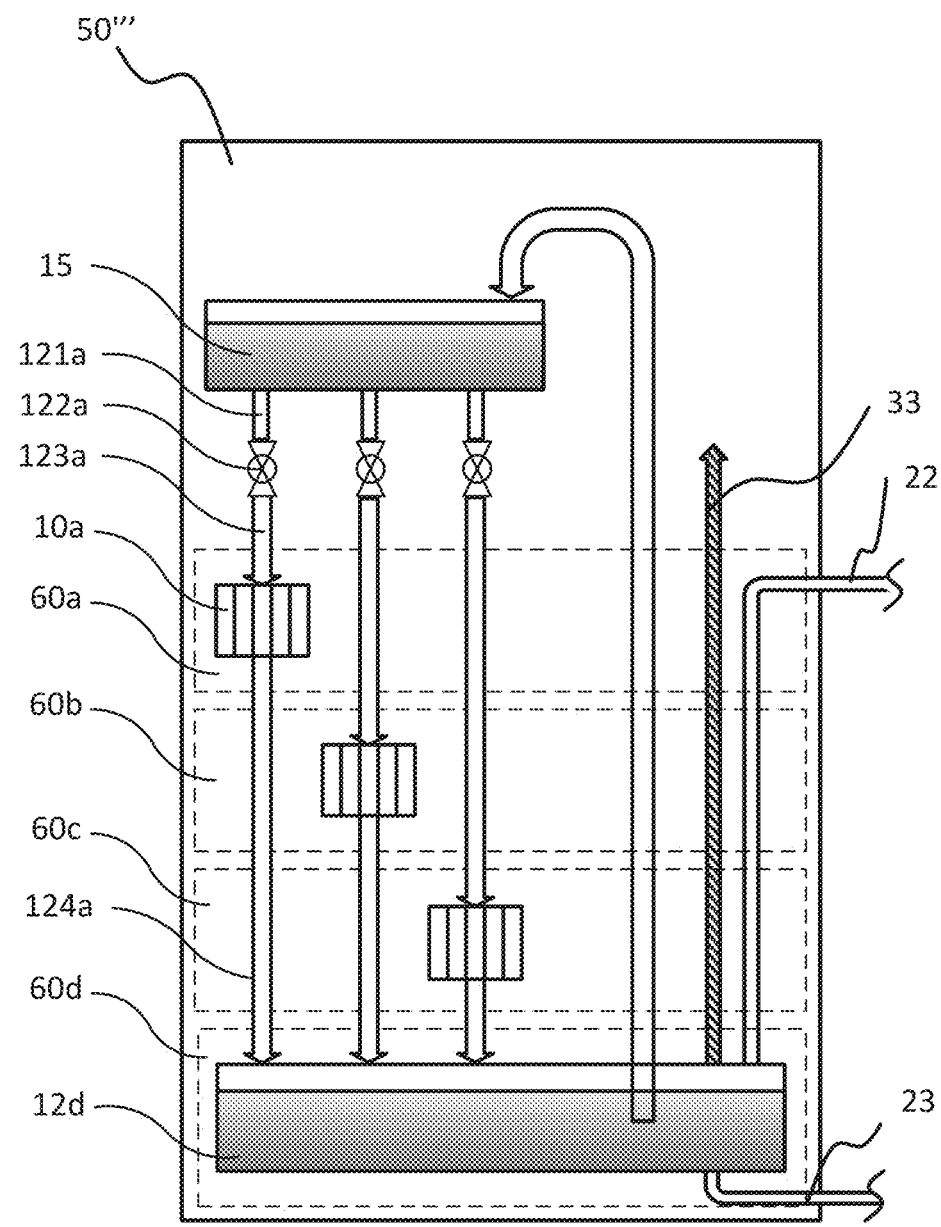
FIG. 5d is a block diagram of a particle regeneration subsystem bay according to an embodiment of the invention, the bay housing a plurality of regenerator stacks utilizing a shared header tank and a shared intermediate/sump tank.

FIG. 5d shows a particle regeneration subsystem (PRS) bay [50‴] according to an embodiment of the invention. PRS bay [50‴] houses one or more regenerator stacks [10] and associated components, and further utilizes a shared header tank [15] and intermediate/sump tank [12d]. The PRS operates substantially as described previously; the PRS regenerates stored energy by feeding metal ion-rich electrolyte from intermediate/sump tank [12d] into header tank [15] and thereafter to regenerator stack [10a] through electrolyte conduit [121a], valve [122a] and electrolyte conduit [123a]. Electrical energy is applied from an external source [42a] to generate metallic particles of a dendritic morphology and release oxygen gas as a by-product of the reaction. The oxygen gas travels through regenerator stack [10a] and electrolyte conduit [124a] and exhausts to the atmosphere [33] at intermediate/sump tank [12d]. The intermediate/sump tank releases generated oxygen at pressures close to atmospheric pressure. The electrolyte-particle slurry produced by regenerator stack [10a] also passes through electrolyte conduit [124a] to intermediate/sump tank [12d] and is then transferred to fuel storage tank [14] through electrolyte conduit [23]. Intermediate/sump tank [12d] is refilled from fuel storage tank [14] through conduit [22]. A similar operation may be followed for each additional regenerator stack contained within PRS bay [50‴]. Each regenerator stack is housed in a sub-compartment [60a, 60b, 60c] of particle regeneration subsystem bay [50‴]. The physical arrangement of each sub-compartment [60a] can be placed independently of additional sub-compartments [60b, 60c]. The shared intermediate/sump tank [12d] is located in the lowest compartment [60d] or in a position equivalent to the lowest [60c] regenerator stack in relation to gravitational positioning. The shared header tank [15] is located above the highest compartment [60a] in relation to gravitational positioning.

In one embodiment, header tank [15] is open to the atmosphere and the removal of metallic particles from regenerator stack [10a] is governed by the fluid pressure developed through header tank [15], conduit [121a], valve [122a] and conduit [123a]. Optionally, conduit [124a] may be sized such that closed channel flow is achieved soon after valve [122a] is opened whereupon the fluid suction developed in conduit [124a] may augment the fluid pressure developed above regenerator stack [10a]. In such a configuration, the fluid flow available for particle removal is substantially independent of the relative height of a regenerator stack with respect to the header and intermediate/sump tanks.

It will be apparent to those skilled in the art that the choice of three regenerator stacks is made for ease of explanation and that an alternative number of regenerator stacks is contemplated by the invention. In a particular embodiment the number of regenerator stacks located in a single bay may range from one to sixteen and the number of electrolytic cells in each regenerator stack may range from one to forty or more. In an application in which rapid recharging of the system is required (such as when solar energy is the only available source), the capacity of the PRS bay may exceed that of the PGS bay. In some embodiments, the ratio of PRS power to PGS power may range from 8:1 to 1:8. In some embodiments, the ratio may be 8:1, 4:1, 2:1, 1:1, 1:2, 1:4 or 1:8.

Figure 6:
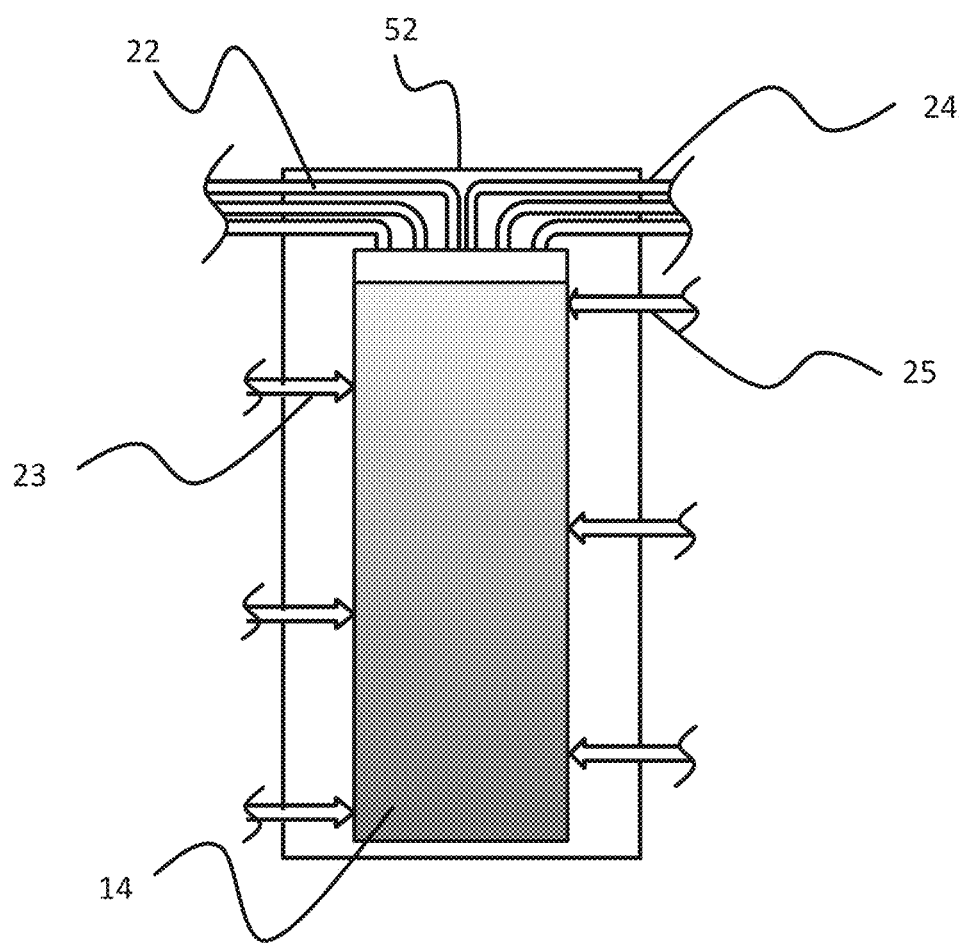
FIG. 6 is a block diagram of a fuel storage subsystem bay according to an embodiment of the invention, the bay housing a fuel storage tank subsystem.

FIG. 6 shows a fuel storage subsystem (FSS) bay [52] according to an embodiment of the invention. FSS bay [52] houses the fuel storage tank subsystem. The FSS operates as described previously; for regeneration, the metal ion-rich electrolyte is fed into the PRS regenerator bay (detailed in FIG. 3a) through electrolyte conduits [22]. Electrolyte-particle slurry is transferred to fuel storage tank [14] through electrolyte slurry conduits [23] after exiting the PRS regenerator bay (detailed in FIGS. 5a, 5b and 5c). The system is discharged by feeding electrolyte-particle slurry through an electrolyte slurry conduit [24] into the PGS power generation bay (detailed in FIG. 7). The electrolyte fuel stream, lean with particles and rich with potassium zincate, is fed back to fuel storage tank [14] from the PGS bay (detailed in FIG. 7) through an electrolyte conduit [25]. It will be apparent to those skilled in the art that the choice of one PRS bay and one PGS bay is made for ease of explanation and that an alternative number of PRS bays and PGS bays are contemplated by the invention. In some embodiments, the number of PRS bays connected to a single FSS bay may range from one to four and the number of PGS bays connected to a single FSS bay may range from one to four. In some embodiments the volume of electrolyte-particle slurry contained by said FSS bay may range from 100 litres to 1000 litres. In some embodiments the energy capacity of said FSS bay may range from 10 kWh to 100 kWh. In some embodiments the volume of electrolyte-particle slurry contained by said FSS bay may range from 1000 litres to 10,000 litres and the energy capacity of said FSS bay may range from 100 kWh to 1000 kWh.

Figure 7:
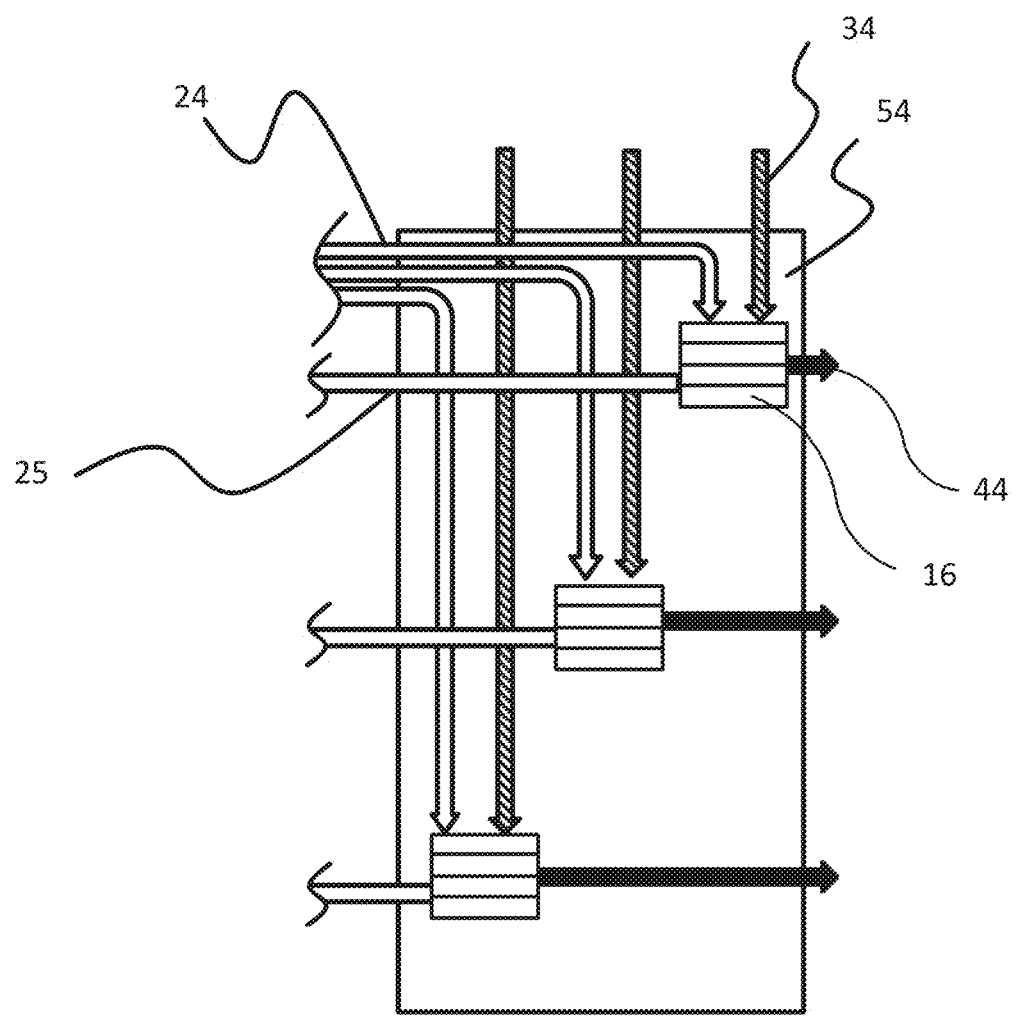
FIG. 7 is a block diagram of the power generation subsystem bay according to an embodiment of the invention, the bay housing a plurality of power generation stacks.

FIG. 7 shows a PGS power generation subsystem bay [54] according to an embodiment of the invention. PGS bay [54] houses one or more power generation stacks [16]. The PGS operates as described previously; the PGS is discharged by feeding electrolyte-particle slurry through electrolyte conduit [24] into power generation stack [16]. Oxygen from the air [34] is also fed into the power generation stack [16] which reacts with the metallic particulate fuel to provide power to a load [44]. The electrolyte fuel stream, lean with metallic particles and rich with metallic ions, is fed back to the FSS bay [52] through electrolyte conduit [25].

It will be apparent to those skilled in the art that the choice of three power generation stacks is made for ease of explanation and that an alternative number of power generation stacks is contemplated by the invention. In some embodiments the number of power generation stacks located in a single bay may range from one to sixteen and the number of fuel cells in each power generation stack may range from one to fifty. In an application in which rapid discharging of the system is required (such as in an electric vehicle recharging station), the capacity of the PGS bay may exceed that of the PRS bay. In some embodiments, the ratio of PGS power to PRS power may range from 8:1 to 1:8. In some embodiments, said ratio may be 8:1, 4:1, 2:1, 1:1, 1:2 1:4 or 1:8.

Figure 8:
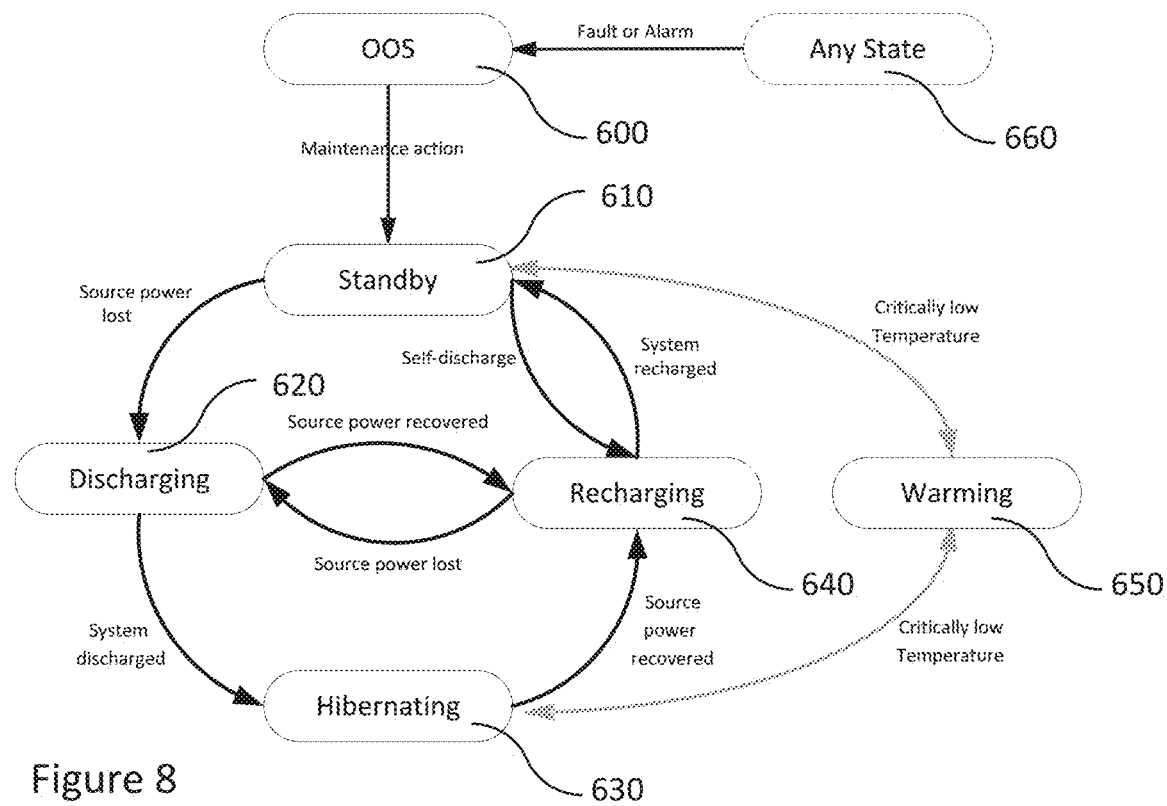
FIG. 8 is a state diagram showing the major operating modes of a regenerative fuel cell system according to an embodiment of the invention.

FIG. 8 is a state diagram describing the major operating modes of the system. The four states of Standby [610], Discharging [620], Hibernating [630] and Recharging [640] represent the normal or "successful" flow of events.

The Standby state [610] is the system state where the FSS tank is fully charged with metallic particulate fuel and the system is receiving power from the source. The Standby state is the default state for the system; its primary purpose is to monitor the system for faults as well as to monitor the source power for faults and to then transition into the Discharging state [620].

The Discharging state [620] is the state in which the power generation subsystem uses the metallic particulate fuel from the storage tank and oxidant from the atmosphere to generate electricity to deliver to the load.

The Hibernation state [630] is the state in which the system is fully discharged having consumed all of the available metallic particulate fuel and can no longer deliver power to the load, and no source power has been restored to the system.

The Recharging state [640] is the state in which the particle regeneration subsystem operates to grow metallic particulate fuel and recharges the system's capacity for generating power.

The Out Of Service state [600] is a maintenance and alarm state in which the system waits for a service action to be performed before resuming operation. State [600] may be entered from any other state [660] when an abnormal event is detected.

The Warming state [650] is an intermediate state that is entered when the external temperature is very low and the system is unable to maintain the minimum temperature for operation.

The benefits of the system as described in FIGS. 2 and 3a-3c will now be described in terms of the process of FIG. 8.

When the system is in Standby state [610], all fluid flows (Q1, Q2 and Q3) may be suspended and the power required for the operation of said flows is conserved. Only a small amount of power is required to monitor the status of the system and determine whether a change in state is required.

When the system is in Discharging state [620], fluid flow (Q3) is activated to deliver a flow of bearer electrolyte to one or a plurality of power generation stacks [16] and the spent fuel is returned to fuel storage tank [14]. Fluid flows (Q1 and Q2) remain idle. The system may remain in this state until all the fuel has been used whereupon it will transition to the Hibernating state [630]. If the source power is restored before all the available fuel is consumed then the system will transition to the Recharging state [640].

When the system is in Hibernating state [630], all fluid flows (Q1, Q2 and Q3) may be suspended and the power required for the operation of said flows is conserved. Only a small amount of power is required to monitor the status of the system and determine whether a change in state is required.

When the system is in Recharging state [640], fluid flows (Q1 and Q2) are activated to deliver a flow of bearer electrolyte to one or a plurality of regenerator stacks [10]. The incorporation of one or a plurality of intermediate tanks [12] enables the reactant products to be substantially separated at atmospheric pressure; the oxygen reactant product [32] is released to the atmosphere while the metallic particulate fuel is returned to fuel storage tank [14]. The independence of fluid flows (Q1) and (Q2) provides further flexibility to the operation of the system. Referring to FIG. 3c for example, fluid flow (Q1a, Q1b) may deliver particulate-rich slurry to sump tank [12d] when source power [42] is present or has been recently present and may deliver particulate-lean slurry to sump tank [12d] otherwise. Fluid flow (Q2) may be activated to exchange the electrolyte slurry present in sump tank [12d] with the bearer-electrolyte present in fuel storage tank [14] at time periods and flow rates that are optimum for said exchange and are not directly related to the immediate status of flow rate (Q1). The inclusion of sump tank [12d] may also be utilized to promote substantial settling of the metallic particulate fuel such that particulate-rich electrolyte is returned to fuel storage tank [14] through conduit [73] and is replaced by particulate-lean electrolyte supplied through conduit [72].

Where a component is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

This application is intended to cover any variations, uses, or adaptations of the invention using its general principles. Further, this application is intended to cover such departures from the present disclosure as come within known or customary practice in the art to which this invention pertains and which fall within the limits of the appended claims. Accordingly, the scope of the claims should not be limited by the preferred embodiments set forth in the description, but should be given the broadest interpretation consistent with the description as a whole.

What is claimed is:

1. A method for storing electrical energy, comprising:
   (a) receiving electrical energy from an external source;
   (b) electro-depositing a metallic particulate material within a regenerator stack by applying the electrical energy;
   (c) delivering the metallic particulate material in a bearer electrolyte from the regenerator stack to a fuel storage tank at a first flow rate;
   (d) storing the metallic particulate material in the bearer electrolyte in the fuel storage tank;
   (e) delivering the stored metallic particulate material in the bearer electrolyte from the fuel storage tank to a power generation stack at a second flow rate;
   (f) generating electricity by discharging the metallic particulate material within the power generation stack;
   (g) returning metal ion rich electrolyte from the power generation stack to the fuel storage tank at a third flow rate; and
   (h) returning metal ion rich electrolyte from the fuel storage tank to the regenerator stack at a fourth flow rate;
   wherein the first flow rate and the fourth flow rate are independently selectable to optimize step (b) and the second flow rate and the third flow rate are independently selectable to optimize step (f) and to allow independent scaling of the regenerator stack, the fuel storage tank and the power generation stack.

2. The method for storing electrical energy according to claim 1, wherein the metallic particulate material comprises zinc particles having a dendritic morphology and a size distribution in the range 10 to 1000 microns.

3. The method for storing electrical energy according to claim 1, wherein an intermediate tank is provided between the regenerator stack and the fuel storage tank.

4. The method for storing electrical energy according to claim 3, comprising exhausting oxygen from the electrolyte from the regenerator stack at the intermediate tank to prevent back pressure of the oxygen from building up in the regenerator stack.

5. The method for storing electrical energy according to claim 4, comprising a plurality of regenerator stacks, wherein each regenerator stack is physically positionable at a different vertical height with respect to the fuel storage tank.

6. The method for storing electrical energy according to claim 3, comprising gravity settling the metallic particulate material from the regenerator stack at the intermediate tank to provide a concentrated flow of the metallic particulate material to the fuel storage tank.

7. The method for storing electrical energy according to claim 3, wherein step (c) comprises delivering the metallic particulate material in the electrolyte from the regenerator stack to the intermediate tank at a fifth flow rate, and delivering the metallic particulate material in the electrolyte from the intermediate tank to the fuel storage tank at a sixth flow rate, wherein the fifth flow rate and the sixth flow rate are independently selectable to optimize step (b) and/or step (c) and to allow independent scaling of the regenerator stack, the intermediate tank and the fuel storage tank.

8. The method for storing electrical energy according to claim 7, wherein step (c) further comprises delivering the metallic particulate material in the electrolyte from the intermediate tank to a sump tank at a seventh flow rate, and from the sump tank to the fuel storage tank at an eighth flow rate, wherein the seventh flow rate and the eighth flow rate are independently selectable to optimize step (b) and/or step (c) and to allow independent scaling of the regenerator stack, the intermediate tank, the sump tank and the fuel storage tank.

9. The method for storing electrical energy according to claim 7, wherein step (c) comprises delivering the metallic particulate material in the electrolyte from a second regenerator stack to a second intermediate tank at an ninth flow rate, and delivering the metallic particulate material in the electrolyte from the second intermediate tank to the fuel storage tank at a tenth flow rate, wherein the ninth flow rate and the tenth flow rate are independently selectable to optimize step (b) and/or step (c) and to allow independent scaling of the regenerator stack, the intermediate tank and the fuel storage tank.

10. The method for storing electrical energy according to claim 8, wherein step (c) further comprises delivering the metallic particulate material in the electrolyte from a second intermediate tank to the sump tank at an eleventh flow rate, and from the sump tank to the fuel storage tank at the eighth flow rate, wherein the eighth flow rate and the eleventh flow rate are independently selectable to optimize step (b) and/or step (c) and to allow independent scaling of the regenerator stack, the intermediate tank, the sump tank and the fuel storage tank.

11. The method for storing electrical energy according to claim 8 comprising exhausting oxygen from the electrolyte from the regenerator stack at the sump tank.

12. The method for storing electrical energy according to claim 8, comprising physically positioning the sump tank at least as low as a lowest physically positioned regenerator stack.

13. The method for storing electrical energy according to claim 3, wherein step (h) comprises returning metal ion rich electrolyte from the fuel storage tank to the intermediate tank at a twelfth flow rate, and returning metal ion rich electrolyte from the intermediate tank to the regenerator stack at a thirteenth flow rate, wherein the twelfth flow rate and the thirteenth flow rate are independently selectable to optimize step (h) and to allow independent scaling of the regenerator stack, the intermediate tank and the fuel storage tank.

14. The method for storing electrical energy according to claim 3, wherein the intermediate tank comprises a header tank and a sump tank, wherein step (h) further comprises returning metal ion rich electrolyte from the sump tank to header tank at a fourteenth flow rate and from the header tank to the regenerator stack at a fifteenth flow rate, wherein the fourteenth flow rate and the fifteenth flow rate are independently selectable to optimize step (h) and to allow independent scaling of the regenerator stack, the sump tank, the header tank and the fuel storage tank, further comprising physically positioning the header tank higher than the highest physically positioned regenerator stack and physically positioning the sump tank lower than the lowest physically positioned regenerator stack.

15. The method for storing electrical energy according to claim 13, wherein step (h) comprises returning metal ion rich electrolyte from the fuel storage tank to a second intermediate tank at a sixteenth flow rate, and returning metal ion rich electrolyte from the second intermediate tank to a second regenerator stack at a seventeenth flow rate, wherein the sixteenth flow rate and the seventeenth flow rate are independently selectable to optimize step (h) and to allow independent scaling of the regenerator stack, the second intermediate tank and the fuel storage tank.

16. The method for storing electrical energy according to claim 3, wherein the intermediate tank comprises a header tank and a sump tank, wherein step (h) comprises returning metal ion rich electrolyte from the sump tank to header tank at a fourteenth flow rate and returning metal ion rich electrolyte from the header tank to a first regenerator stack at an eighteenth flow rate and from the header tank to a second regenerator stack at a nineteenth flow rate, wherein the eighteenth flow rate and the nineteenth flow rate are independently selectable to optimize step (b) and/or step (f) and to allow independent scaling of the regenerator stacks, the sump tank, the header tank and the fuel storage tank, further comprising physically positioning the header tank higher than the highest physically positioned regenerator stack and physically positioning the sump tank lower than the lowest physically positioned regenerator stack.

17. The method for storing electrical energy according to claim 16, comprising a priming step of setting the eighteenth flow rate and the nineteenth flow rate at zero and allowing the sump tank to fill the header tank with metal ion rich electrolyte to displace air in the header tank by opening a check valve in the header tank, and then subsequently closing the check valve and allowing the eighteenth flow rate and/or the nineteenth flow rate to resume through closed channel flow, wherein the closed channel flow also contributes to the fourteenth flow rate.

* * * * *